US010793004B2

(12) United States Patent
Hwang et al.

(10) Patent No.: US 10,793,004 B2
(45) Date of Patent: Oct. 6, 2020

(54) VEHICLE CONTROL DEVICE AND VEHICLE INCLUDING THE SAME

(71) Applicant: LG Electronics Inc., Seoul (KR)

(72) Inventors: Inyoung Hwang, Seoul (KR); Sanga Kim, Seoul (KR); Kyoungha Lee, Seoul (KR); Taeyoung Jeon, Seoul (KR); Kangmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/942,910

(22) Filed: Apr. 2, 2018

(65) Prior Publication Data
US 2019/0084421 A1 Mar. 21, 2019

(30) Foreign Application Priority Data

Sep. 15, 2017 (KR) ........................ 10-2017-0118893

(51) Int. Cl.
*B60K 37/02* (2006.01)
*G06F 3/0481* (2013.01)
*B60K 37/06* (2006.01)
*G06F 3/0488* (2013.01)

(52) U.S. Cl.
CPC .............. *B60K 37/02* (2013.01); *B60K 37/06* (2013.01); *G06F 3/04817* (2013.01); *B60K 2370/11* (2019.05); *B60K 2370/115* (2019.05); *B60K 2370/119* (2019.05); *B60K 2370/122* (2019.05); *B60K 2370/143* (2019.05); *B60K 2370/145* (2019.05); *B60K 2370/1438* (2019.05); *B60K 2370/151* (2019.05); *B60K 2370/182* (2019.05); *B60K 2370/186* (2019.05); *B60K 2370/195* (2019.05); *B60K 2370/21* (2019.05); *G06F 3/0488* (2013.01)

(58) Field of Classification Search
None
See application file for complete search history.

(56) References Cited

U.S. PATENT DOCUMENTS

| 9,261,994 | B2 | 2/2016 | Lee et al. |
| 9,756,161 | B2 * | 9/2017 | Bang ..................... H04M 1/271 |
| 10,410,319 | B2 * | 9/2019 | Wunderlich ....... G06K 9/00362 |
| 10,437,381 | B2 * | 10/2019 | Wright .................. G06F 3/0416 |

(Continued)

FOREIGN PATENT DOCUMENTS

| JP | 2010108185 | 5/2010 |
| JP | 2014133506 | 7/2014 |
| KR | 101640053 | 7/2016 |

OTHER PUBLICATIONS

Extended European Search Report in European Appln. No. 18182963.1, dated Feb. 19, 2019, 7 pages.

*Primary Examiner* — Peter D Nolan
(74) *Attorney, Agent, or Firm* — Fish & Richardson P.C.

(57) ABSTRACT

Provided are a vehicle control device for controlling one or more displays provided in a vehicle, and a vehicle including the same. The vehicle control device includes a communication unit performing communication with the one or more displays, and a processor controlling, when an event occurs, the one or more displays to display a home button corresponding to the event using the communication unit, wherein the home button is configured to display a preset icon list in response to a touch applied to the home button, and the preset icon list is varied according to the event.

20 Claims, 23 Drawing Sheets

(56) References Cited

U.S. PATENT DOCUMENTS

| | | | |
|---|---|---|---|
| 2009/0225036 A1* | 9/2009 | Wright | G06F 3/0416 |
| | | | 345/173 |
| 2010/0238129 A1* | 9/2010 | Nakanishi | G06F 3/016 |
| | | | 345/173 |
| 2013/0185662 A1* | 7/2013 | Quattrocolo | B60K 37/06 |
| | | | 715/764 |
| 2014/0152600 A1* | 6/2014 | Lee | G06F 3/0482 |
| | | | 345/173 |
| 2014/0380243 A1* | 12/2014 | Furue | G06F 3/0362 |
| | | | 715/835 |
| 2015/0309573 A1* | 10/2015 | Brombach | B60K 37/02 |
| | | | 715/702 |
| 2015/0339031 A1* | 11/2015 | Zeinstra | B60K 37/06 |
| | | | 715/747 |
| 2016/0062635 A1* | 3/2016 | Feit | G06F 3/0481 |
| | | | 715/765 |
| 2017/0053616 A1* | 2/2017 | Mueller | B60K 37/06 |
| 2017/0249718 A1* | 8/2017 | Wunderlich | G06T 3/20 |
| 2018/0113560 A1* | 4/2018 | Wright | G06F 3/0416 |
| 2018/0196589 A1* | 7/2018 | Feit | G06F 3/0486 |
| 2018/0196990 A1* | 7/2018 | Xu | G06F 3/041 |

* cited by examiner

VEHICLE CONTROL DEVICE AND VEHICLE INCLUDING THE SAME

CROSS-REFERENCE TO RELATED APPLICATION

Pursuant to 35 U.S.C. § 119(a), this application claims the benefit of earlier filing date and right of priority to Korean Application No. 10-2017-0118893, filed on Sep. 15, 2017, the contents of which is incorporated by reference herein in its entirety.

BACKGROUND OF THE INVENTION

1. Field of the Invention

The present disclosure relates to a vehicle control device for controlling one or more displays provided in a vehicle, and a vehicle including the same.

2. Background of the Invention

A vehicle refers to a means of transportation for moving people or a load using kinetic energy. Typical examples of the vehicle may be an automobile and a motor cycle.

For the purpose of safety and convenience of users who use vehicles, various sensors and devices are provided in vehicles and functions of vehicles have been diversified.

Functions of vehicles may be divided into a convenience function for promoting drivers' convenience and a safety function for promoting safety of drivers and/or pedestrians.

First, the convenience function has development motives related to drivers' convenience such as providing an infortainment (information+entertainment) function to vehicles, supporting a partial autonomous driving function, or assisting a driver to secure a visual field at night or in a blind spot. For example, the convenience function includes active cruise control (ACC), a smart parking assist system (SPAS), a night vision (NV), a head-up display (HUD), an around view monitor (AVM), an adaptive headlight system (AHS), and the like.

The safety function is a technique of securing driver's safety and/or pedestrian's safety, including a lane departure warning system (LDWS), a lane keeping assist system (LKAS), an autonomous emergency braking (AEB) function, and the like.

Vehicles include one or more displays for at least one occupant present therein, and as functions of vehicles are diversified, various types of driving information are provided on displays. As displays are changing from devices simply transmitting information to devices communing with users, development of a user interface capable of controlling a display within a vehicle is required.

SUMMARY OF THE INVENTION

Therefore, an aspect of the detailed description is to solve the aforementioned problems and any other problems.

Another aspect of the present disclosure provides a user interface configured to allow an occupant present within a vehicle to control a display within the vehicle. In detail, the present disclosure provides a vehicle control device capable of allowing a user to simply control a display region allocated to the user using a home button, and a vehicle including the same.

Another aspect of the present disclosure provides an optimal user interface for an occupant present within a vehicle and provides a home button which can be varied in various manners according to situations, rather than providing a fixed number of home buttons in fixed positions. Also, the present disclosure provides a vehicle control device capable of effectively using a display region allocated to an occupant using a home button of the occupant, and a vehicle including the same.

Another aspect of the present disclosure provides a vehicle control device allowing a driver of a vehicle to limit types of application which may be used by a fellow passenger within the vehicle, and a vehicle including the same.

To achieve these and other advantages and in accordance with the purpose of this specification, as embodied and broadly described herein, a vehicle control device for controlling one or more displays provided in a vehicle is provided.

The vehicle control device includes: a communication unit performing communication with the one or more displays; and a processor controlling, when an event occurs, the one or more displays to display a home button corresponding to the event using the communication unit, wherein the home button is configured to display a preset icon list in response to a touch applied to the home button, and the preset icon list is varied according to the event.

When a first event occurs, the processor may control the communication unit to display a first home button corresponding to the first event on a first display, and when a second event occurs, the processor may control the communication unit to display a second home button corresponding to the second event on a second display.

The event is that an occupant gets in the vehicle, and the preset icon list may be varied according to at least one of characteristics of the occupant and a get-in position of the occupant.

When the occupant gets off the vehicle, the processor may control the communication unit to remove the home button.

The processor may receive an image from a camera imaging the inside of the vehicle, select any one of preset icon lists on the basis of an image of an occupant included in the image, and set the selected icon list as the preset icon list in the home button.

The processor may select at least one display on the basis of a position where the occupant is present and control the communication unit to display the home button on the at least one selected display, the at least one selected display may be varied according to the event, and the home button may not be displayed on the other unselected displays.

When first and second occupants get in the vehicle, the processor may control the communication unit to display a first home button corresponding to the first occupant and a second home button corresponding to the second occupant.

The first home button may be displayed on the first display and change a screen displayed on the first display, and the second home button may be displayed on the second display and change a screen displayed on the second display.

When the first and second home buttons are displayed on the any one display, the any one display may be divided into a first region displaying a first screen and a second region displaying a second screen.

The first home button may change the first screen of the first region, and the second home button may change the second screen of the second region.

When a drag input is applied to any one of the first and second home buttons, the any one home button may be moved according to the drag input and the first and second regions may be varied according to a position of the any one home button.

When the any one home button is positioned within a predetermined distance from the other home button according to the drag input, the processor may control the communication unit such that the other home button and the second screen may disappear and the first screen is displayed in the first and second regions.

A boundary demarcating the first and second regions may be displayed on the any one display, and when a touch input is applied to the boundary, the processor may adjust a size of at least one of the first and second regions and change display of at least one of the first and second home buttons according to the adjusted size.

The processor may control the communication unit to remove at least one of the first and second home buttons in response to a home button removal command.

When the occupant gets on a first seat, the home button may be displayed on the first display, and when the occupant gets on a second seat, the home button may be displayed on the second display.

The preset icon list may include a first icon configured to control an electric/electronic component installed in the first seat or a region adjacent to the first seat, and when the occupant gets on the second seat, the preset icon list may include a second icon configured to control an electric/electronic component installed in the second seat or a region adjacent to the second seat.

The processor may recognize a fingerprint from a touch input applied to the home button, and when the fingerprint is recognized in a state in which a first icon list is set to be displayed in the home button, the processor may change a setting of the home button such that a second icon list different from the first icon list is displayed.

When the fingerprint is not recognized, the home button may be changed from a first shape to a second shape.

The processor may select the number of home buttons on the basis of the event, and control the communication unit to display one or more home buttons corresponding to the selected number.

When a preset condition is met, a pop-up window may be displayed, and the processor may control the communication unit to display one or more pop-up windows corresponding to the selected number.

Also, the present disclosure may extend to a vehicle having the aforementioned vehicle control device and/or a vehicle control method.

Advantages and effects of the vehicle control device and a vehicle including the same according to the present disclosure are as follows.

An occupant using a vehicle to which the present disclosure is applied may use an interface modified to be optimized for the occupant himself, rather than using an interface provided by a manufacturer unilaterally.

The vehicle control device according to the present disclosure may divide one display into a plurality of regions by displaying a plurality of home buttons on the one display. Occupants may execute various functions using a display region given to them using a unique home button given to them. Also, since regions may be reset using the home button, user convenience may be increased.

In the vehicle control device according to the present disclosure, when a home button removal command is input from the driver, the communication unit may be controlled such that home buttons displayed on the one or more displays are removed. An icon list including various icons is set in the home button, and since the home button itself is not displayed, access to the icons is fundamentally interrupted.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
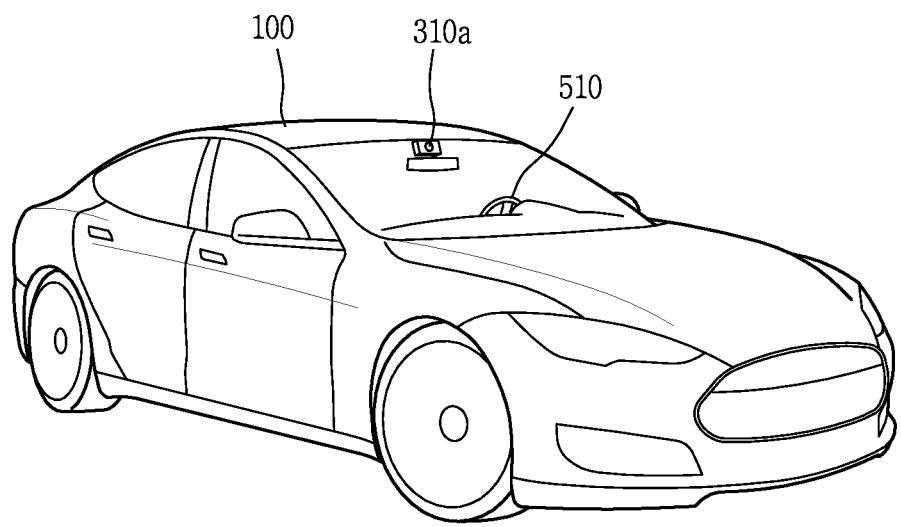
FIG. 1 is a view illustrating an appearance of a vehicle according to an embodiment of the present disclosure.
Figure 1:
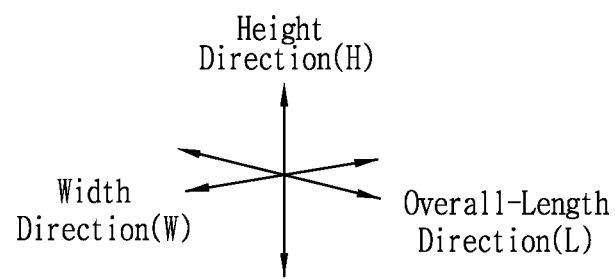

FIG. 1 is a view illustrating appearance of a vehicle in accordance with an embodiment of the present invention.

Figure 2:
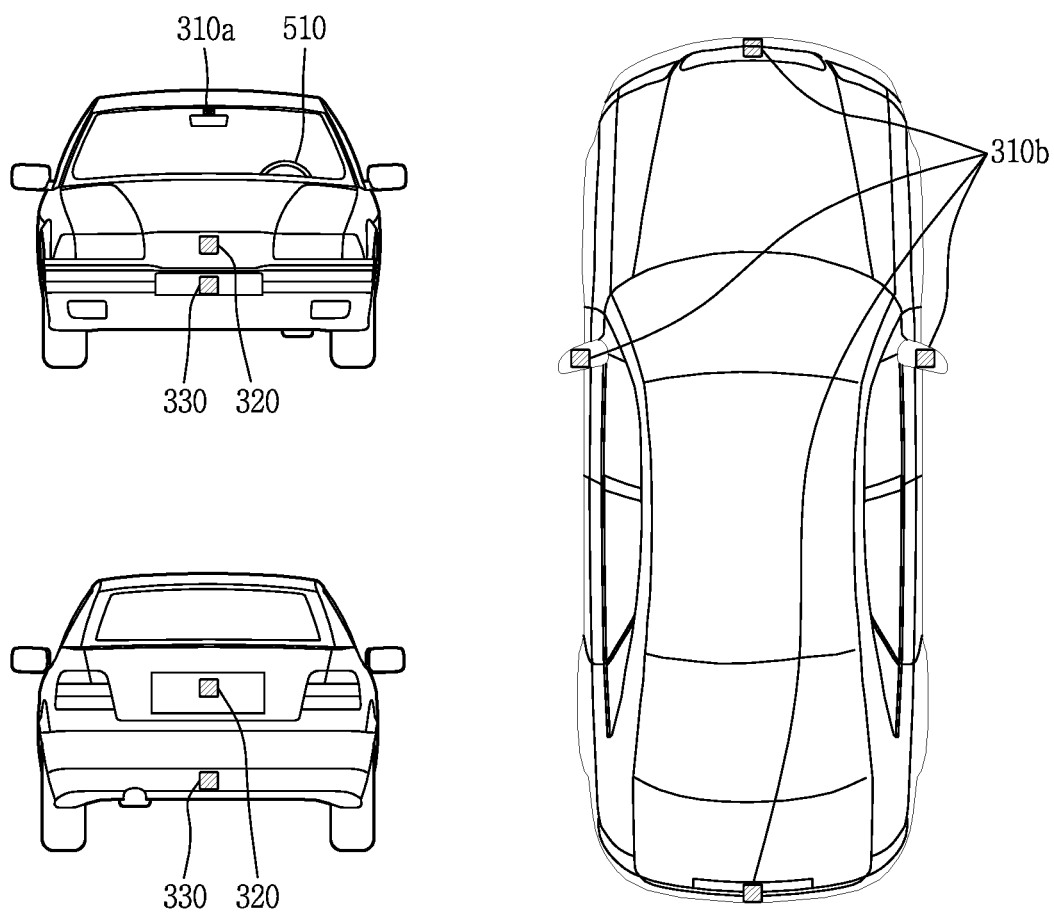
FIG. 2 is a view illustrating a vehicle according to an embodiment of the present disclosure viewed at various angles.

FIG. 2 is a view illustrating appearance of a vehicle at various angles in accordance with an embodiment of the present invention.

Figure 3:
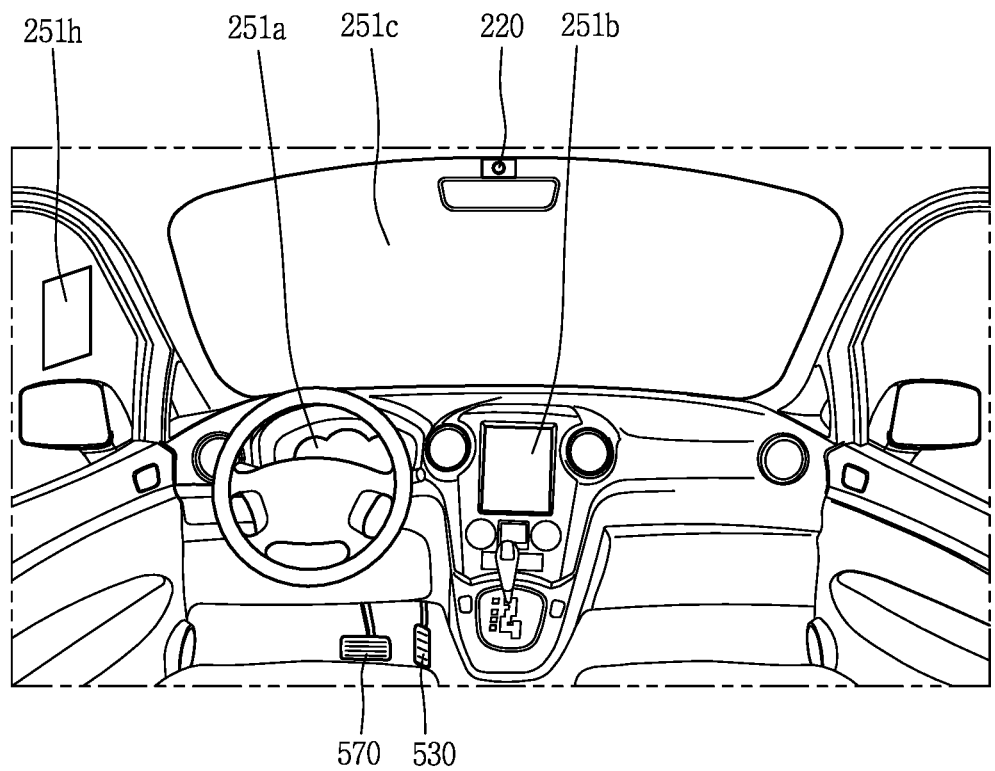
FIGS. 3 and 4 are views illustrating the inside of a vehicle according to an embodiment of the present disclosure.
Figure 4:
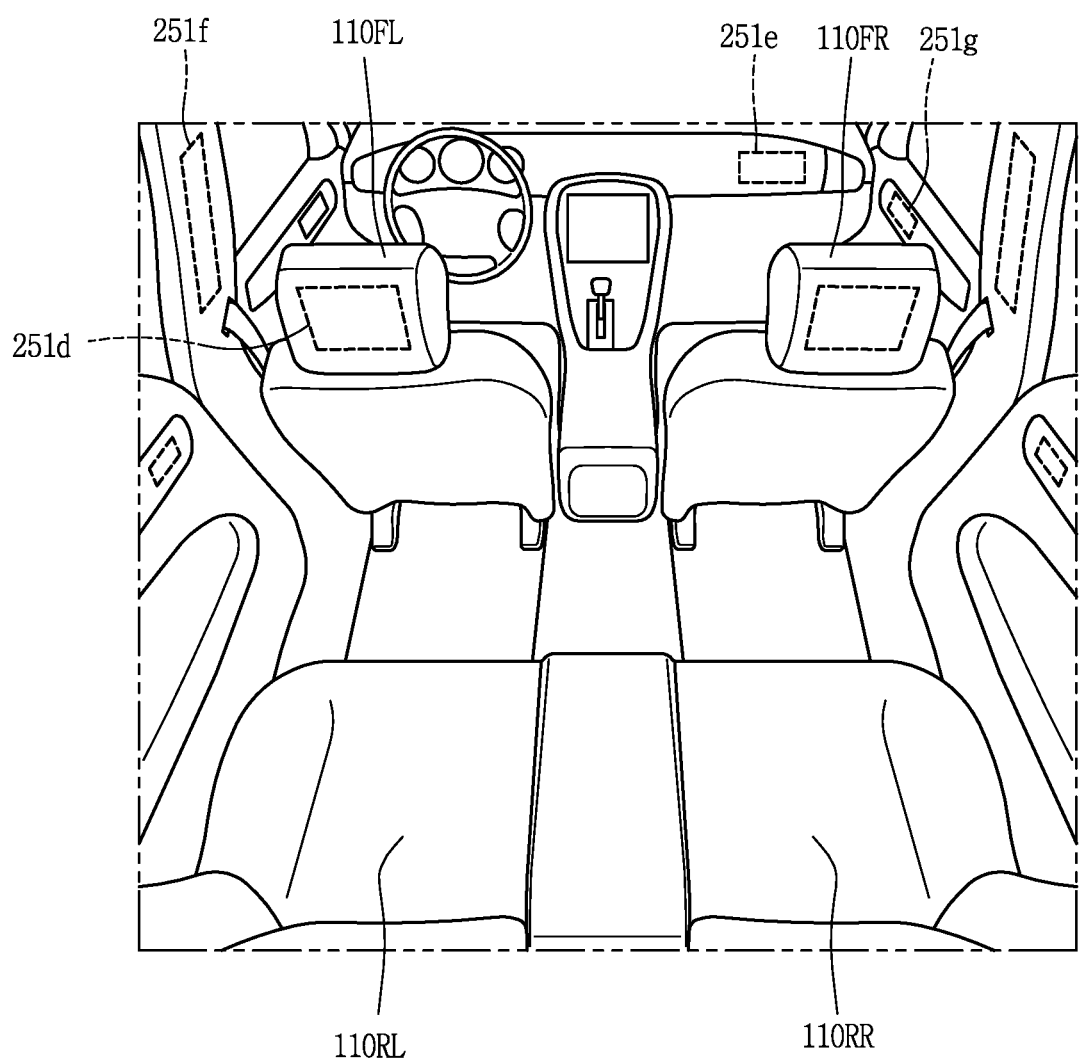

FIGS. 3 and 4 are views illustrating an inside of a vehicle in accordance with an embodiment of the present invention.

Figure 5:
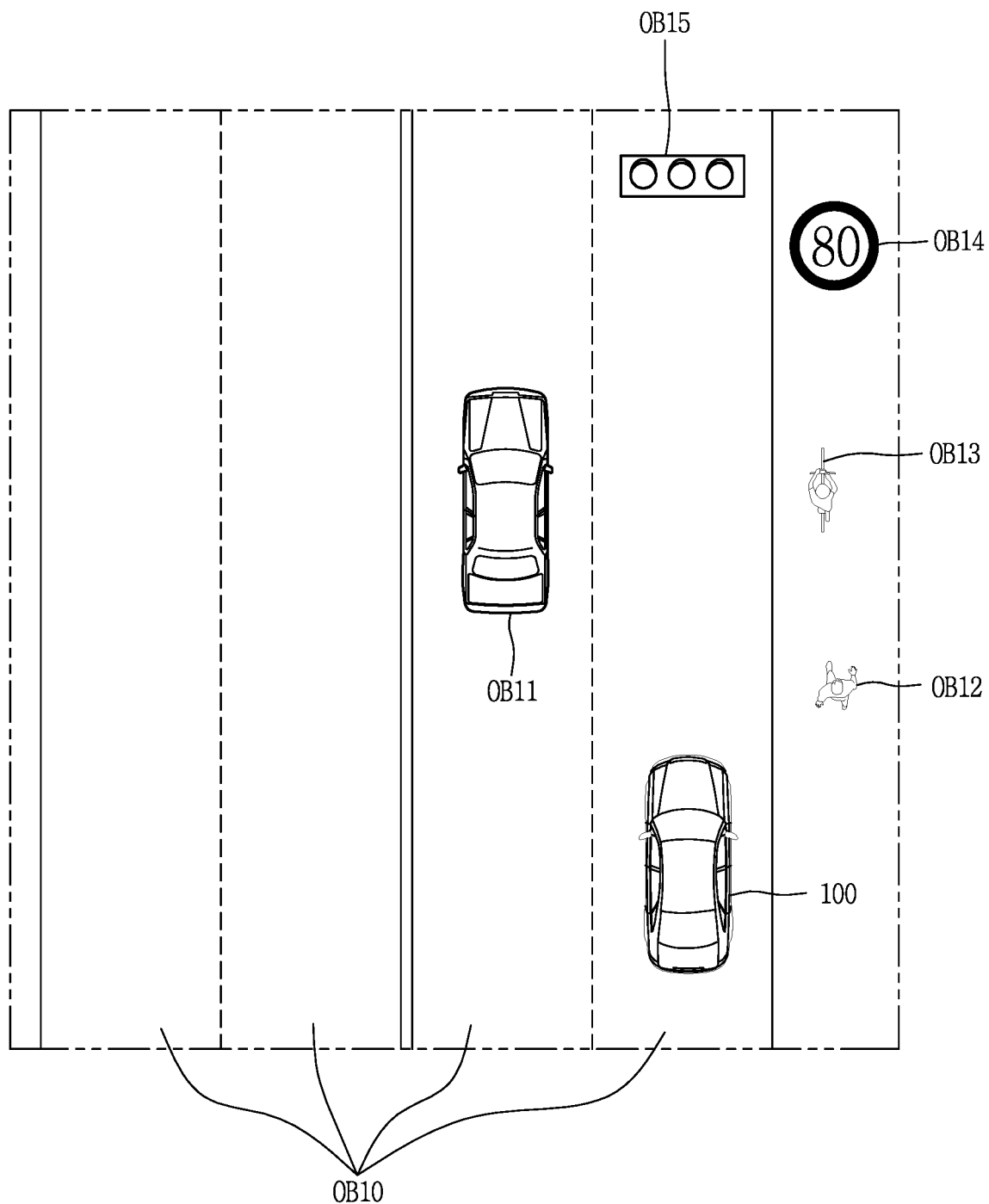
FIGS. 5 and 6 are views referred to in explaining an object according to an embodiment of the present disclosure.
Figure 6:
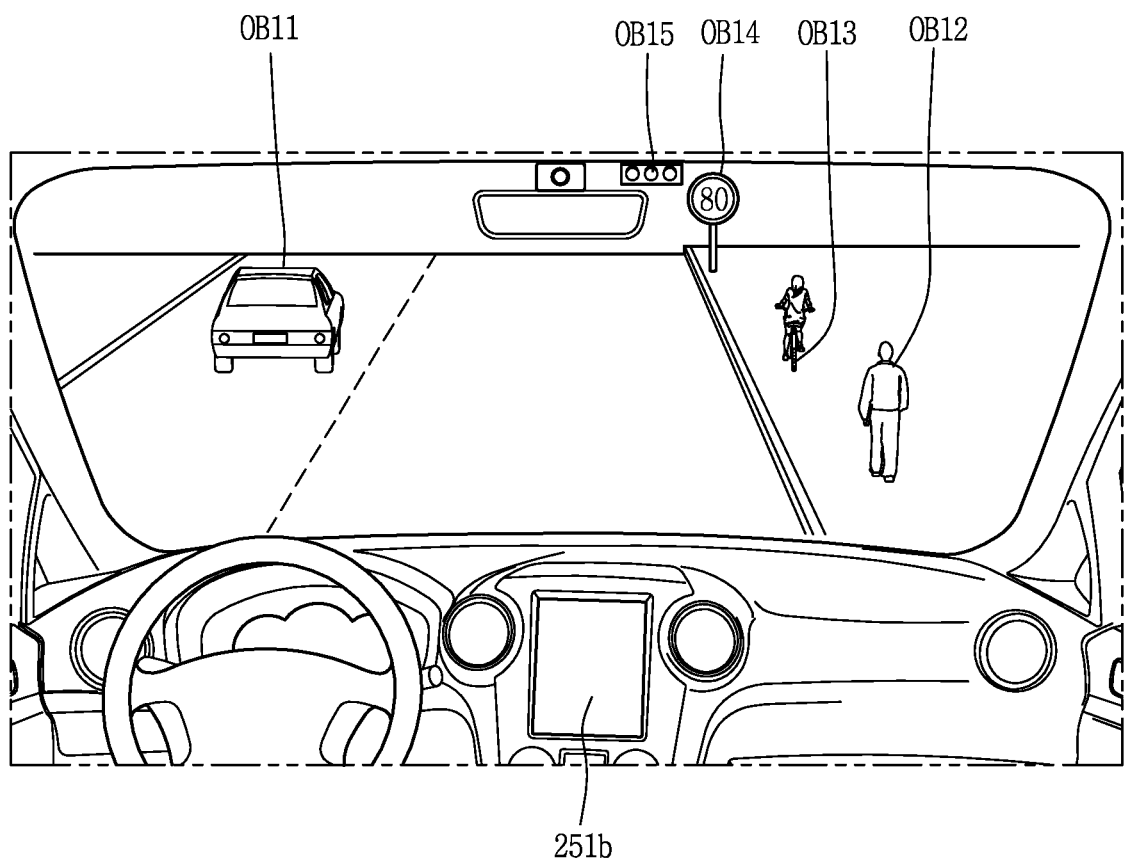

FIGS. 5 and 6 are reference views illustrating objects in accordance with an embodiment of the present invention.

Figure 7:
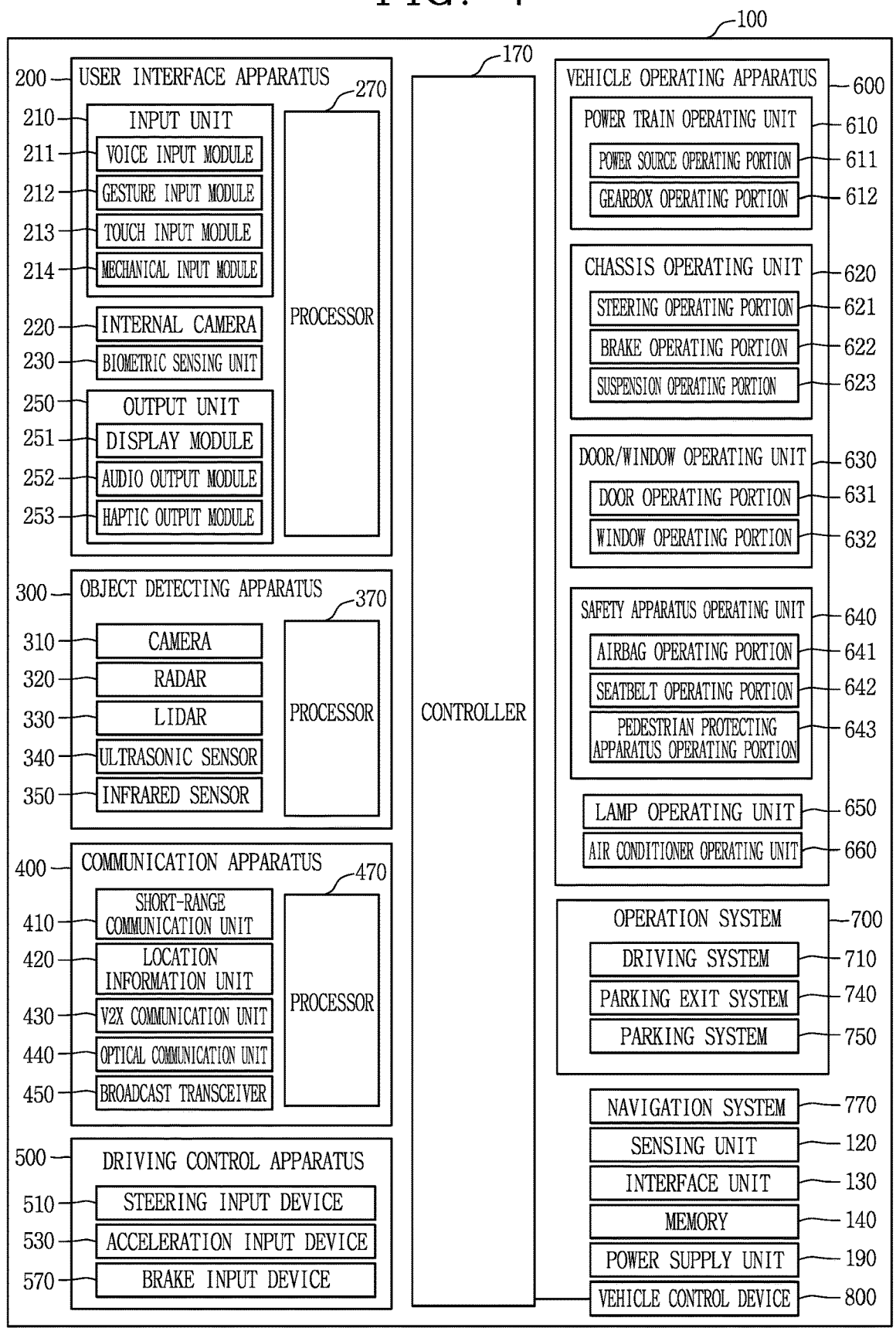
FIG. 7 is a block diagram referred to in explaining a vehicle according to an embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, a vehicle control device 800 provided in the vehicle 100 will be described in detail.

The vehicle control device 800 provided in the vehicle 100 may be configured as an independent device detachably attached to the vehicle 100 or may be integrally installed as part of the vehicle 100.

Hereinafter, for the purposes of description, it is assumed that the vehicle control device 800 is a separate component independent from the controller 170 of the vehicle 100. However, this is merely illustrative and every operation and control method of the vehicle control device 800 described in this disclosure may be performed by the controller 170 of the vehicle 100. That is, an operation and/or a control method performed by the processor 830 of the vehicle control device 800 may be performed by the controller 170 of the vehicle 800.

Figure 8:
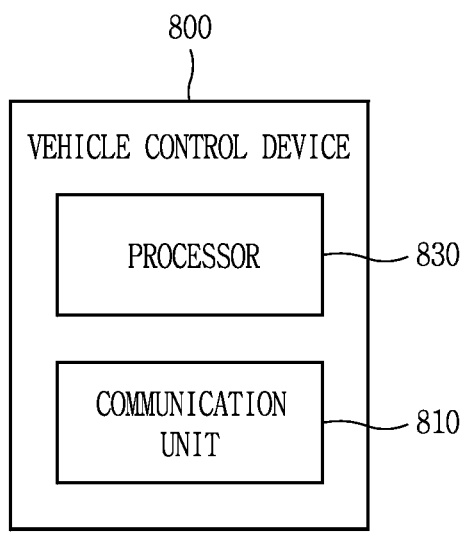
FIG. 8 is a conceptual view illustrating a vehicle control device according to an embodiment of the present disclosure.

FIG. 8 is a conceptual view illustrating a vehicle control device according to an embodiment of the present disclosure.

Referring to FIG. 8, the vehicle control device 800 includes a communication unit 810 and a processor 830.

The communication unit 810 is configured to perform communication with various components described above with reference to FIG. 7. For example, the communication unit 810 may receive various types of information provided through a controller area network (CAN). In another example, the communication unit 810 may perform communication with a vehicle, a mobile terminal and a server, and any device which is able to communicate with other vehicle. This may be termed vehicle-to-everything (V2X) communication. V2X communication may be defined as a technology of exchanging or sharing information such as traffic situation, or the like, while communicating with a road infrastructure and other vehicle, during driving.

The communication unit 810 may communicate with one or more displays provided in the vehicle 100.

Also, the communication unit 810 may receive information related to driving of a vehicle from most devices provided in the vehicle 100. In the vehicle 100, information transmitted to the vehicle control device 800 will be referred to as "vehicle driving information".

The vehicle driving information includes vehicle information and surrounding information of the vehicle. Information related to the inside of the vehicle with respect to a frame of the vehicle 100 may be defined as vehicle information, and information related to the outside of the vehicle may be defined as surrounding information.

Vehicle information refers to information regarding a vehicle itself. For example, vehicle information may include a driving speed of a vehicle, a running direction, acceleration, an angular velocity, a position (GPS), a weight, the number of occupants in a vehicle, braking power of a vehicle, maximum braking power of a vehicle, pressure of each wheel, centrifugal force applied to a vehicle, a running mode of a vehicle (whether the vehicle is in an autonomous driving mode or a manual driving mode), a parking mode of a vehicle (autonomous parking mode, autonomic parking mode, manual parking mode), whether a user is present within a vehicle, information related to a user, and the like.

The surrounding information refers to information regarding another object positioned within a predetermined range around a vehicle and information related to the outside of a vehicle. For example, the surrounding information may be a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, brightness around the vehicle, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information may include ambient brightness, temperature, a location of the sun, information of an object positioned nearby ((person, another vehicle, a sign, etc.), a type of a road surface on which the vehicle is driving, a geographic feature, line information, or lane information in which the vehicle is driving, and information required for autonomous driving/autonomous parking/automatic parking/manual parking mode.

Also, the surrounding information may further include a distance between an object present in the vicinity of the vehicle 100 and the vehicle 100, a possibility of collision, a type of the object, a parking space in which the vehicle may park, an object (e.g., a parking line, a string, another vehicle, a wall, etc.) for identifying the parking space, and the like.

The vehicle driving information is not limited to the examples described above and may include every information generated from components provided in the vehicle 100.

Meanwhile, the processor 830 may be configured to control one or more displays provided in the vehicle 100 using the communication unit 810.

In detail, the processor 830 may determine whether at least one of a plurality of preset conditions is satisfied on the basis of vehicle driving information received through the communication unit 810. According to the satisfied condition, the processor 830 may control the one or more displays in different manners.

Regarding a preset condition, the processor 830 may sense occurrence of an event in an electronic/electronic component and/or application provided in the vehicle 100, and determine whether the sensed event meets the preset condition. Here, the processor 830 may sense that event has occurred from information received through the communication unit 810.

The application, a concept including a widget, a home launcher, and the like, refers to any type of program which can be driven in the vehicle 100. Thus, the application may be a program performing a function of a Web browser, video play, message transmission/reception, schedule management, and application updating.

In addition, the application may include at least one of a forward collision warning (FCW), blind spot detection (BSD), land departure warning (LDW), pedestrian detection (PD), curve speed warning (CSW), and turn-by-turn navigation (TBT).

For example, an even may occur in the case of an absent call, in case where there is an application to be updated, in case where a message arrives, start-on, start-off, autonomous driving ON/OFF, display activation key pressing (LCD awake key), alarm, incoming call, missed notification, and the like.

In another example, an event occurs when warning set in an advanced driver assistance system (ADAS) occurs and when a function set in the ADAS is performed. For example, it is considered that an event occurs when forward collision warning (FCW) occurs, blind spot detection (BSD) occurs, when lane departure warning (LDW) occurs, when lane keeping assist warning occurs, and when an autonomous emergency braking is performed.

In another example, it is considered that an event occurs in case where a forward gear is switched to a reverse gear, in case where acceleration greater than a predetermined value occurs, in case where deceleration greater than a predetermined value occurs, in case where a power unit is switched from an internal combustion to a motor, or in case where a power unit is switched from the motor to the internal combustion.

In addition, it is considered that an event occurs when various ECUs provided in the vehicle 100 performs a specific function.

In case where a generated event satisfies a preset condition, the processor 830 controls the communication unit 810 such that information corresponding to the satisfied condition is displayed on the one or more displays.

Hereinafter, an operation of the vehicle control device 800 will be described in detail with reference to the accompanying drawings.

Figure 9:
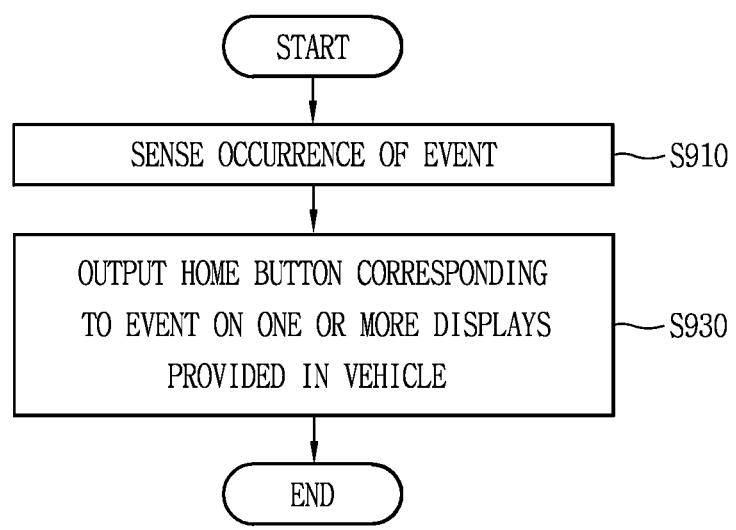
FIG. 9 is a flow chart illustrating a method for controlling the vehicle control device of FIG. 8.

FIG. 9 is a flow chart illustrating a method for controlling a vehicle control device of FIG. 8.

First, the processor 830 senses that an event has occurred within the vehicle 110 (S910).

The event has been set to output a home button and may be variously defined according to embodiments.

The event may occur when a person gets in the vehicle 100, when the person requests a home button, when a driver setting on the driver's seat requests a home button for another occupant, and the like.

The processor 830 may sense occurrence of the event on the basis of information received from various electric/electronic components provided in the vehicle 100. For example, the processor 830 may sense occurrence of the event when a door of the vehicle 100 is open, when a weight sensor provided on the seat of the vehicle 100 senses a weight greater than a predetermined weight, when an occupant is included in an image obtained by capturing the inside of the vehicle 100, and when a user input is sensed from a menu and/or button generating a home button request.

Thereafter, the process 830 outputs a home button corresponding to an event to one or more displays provided in the vehicle 100 (S930).

Here, the home button is defined as a graphic object configured to display a preset icon list in response to a touch applied to the home button. In other words, when a touch is applied to the home button, a home screen page is displayed and an icon list including one or more icons is included in the home screen page.

The home button may be a starting point of a user interface to connect the vehicle to an occupant, and the occupant may execute a predetermined function using the home button. When the predetermined function is executed and an execution screen thereof is displayed, the home button may be displayed at one point on the execution screen, and thus, the occupant may effectively use a display given to the occupant.

The occupant may execute various functions using the home button. When a first touch input is applied to the home button, a first function may be executed, and when a second touch input is applied, a second function may be executed. For example, when a short touch is applied to the home button, a home screen page including the preset icon list may be output, when a long touch is applied, fingerprint recognition may be performed, and when a double touch is applied, an execution screen of a recently executed application may be output.

Meanwhile, the icon list previously set in the home button may be varied according to events.

For example, when a first event occurs, a first home button corresponding to the first event may be displayed on a first display. A first icon list may be set in the first home button. Meanwhile, when a second event occurs, a second home button corresponding to the second event may be displayed on the second display and a second icon list may be set in the second home button. That is, different home buttons in which different icon lists are set may be displayed on different displays according to events.

In the related art vehicle, a display is provided only on a dashboard for a driver or a center fascia shared by every occupant. Since functions of the display are limited, a preset interface is inevitably continuously provided without a change.

Since a display used in each of a plurality of seats provided in the vehicle is provided by seats, a user interface allowing each occupant present in each seat to effectively control a display provided to each occupant is required.

However, every function which can be executed in the vehicle cannot be permitted to a fellow passenger, not a driver, because it directly relates to safety of the fellow passenger. Also, the driver has needs that the fellow passenger should be given limited authority. For example, in case where a driver gets in a vehicle with a child, the driver may want a function of adjusting temperature or a function of opening a door not to be provided to the child.

Reflecting such needs, the vehicle control device 800 according to the present disclosure controls the vehicle 100 such that a home button is not displayed until an event occurs, and here, the vehicle control device 800 may change an icon list set in the home button.

For example, the event may occur when a person gets in the vehicle 100.

In this case, the icon list previously set in the home button may be varied depending on at least one of characteristics of the occupant and a position of the occupant.

For example, when the occupant is a child younger than a minimum age, an icon list for children including application icons which can be used by the child, excluding an application icon which cannot be used by a child may be set in the home button in advance.

In another example, in case where the passenger is an elderly person, an icon list for elderly people including icons of applications appropriate for the elderly person to use may be set in the home button in advance. Also, at least one of a size of an icon included in the icon list and a size of the home button may be increased. In general, the size of the icon and the size of the home button are a first size, and when the icon list for elderly people is set in the home button, the size of the icon and the size of the home button may be a second size greater than the first size.

The icon list set in the home button may be varied depending on individuals. For example, one vehicle may be shared by four family members including mother, father, daughter and son. When the son gets in the vehicle 100, an icon list previously stored by the son may be set in the home button. Or, an icon list for the son including icons frequently used by the son may be set in the home button. Meanwhile, when the daughter gets in the vehicle 100, an icon list for the daughter, different from the icon list for the son, may be set in the home button.

The home button may have different images according to types of event. Here, different images refer to images different in shape, length, color, and the like. Also, the home button may be displayed in different positions according to types of event.

A person who uses the vehicle 100 to which the present disclosure is applied may use an interface modified in a manner optimized for the person, rather than using an interface provided by a manufacturer unilaterally. Also, the occupant may create a home button of its own.

In order to check features of the occupant, the processor 830 may receive an image from a camera imaging the inside of the vehicle 100 and select any one of the preset icon lists on the basis of an image of the occupant included in the image. Also, the selected icon list may be set as the preset icon list in the home button.

The preset icon lists may include at least one of a common icon list commonly used by multiple unspecified users and a specific icon list customized for a specific user.

When a person gets in the vehicle and an image of the occupant matches a previously stored user, a specific icon list for the matched user is selected. When a user matched the occupant image is not present, a common icon list set as a default is selected. In other words, a specific home button in which the specific icon list is set may be displayed or a common home button in which the common icon list is set may be displayed.

An icon list may be customized in various manners.

For example, in case where a new user gets in the vehicle, a home button in which the common ion list is set is provided. The new user may add a new icon to the common icon list, delete an icon, or change a display position of a certain icon.

When the common icon list starts to be changed according to an input from the new user, the processor 830 generates a specific icon list for the new user. The processor 830 may capture an image using a camera for imaging the inside of the vehicle 100 and specify the new user using the captured image. By registering a fingerprint of the new user and registering an ID and a password, the processor may generate a specific icon list for the new user.

In another example, the new user may set a vehicle home screen page using various terminals.

The various terminals may be a mobile terminal to which the Internet is connected and/or a fixed terminal such as a computer.

The vehicle home screen page, including the home button, an icon list set in the home button, and a background image, may be defined as a screen displayed when the new user gets in the vehicle 100. The new user may generate, edit, or delete a vehicle home screen page of his own using a terminal.

The new user may register a fingerprint or register his own image under the conditions for displaying the vehicle home screen page.

In case where a fingerprint is registered, when the new user gets in the vehicle, the common hole button is displayed. Thereafter, in case where a fingerprint of the new user is input to a fingerprint scanner provided in the vehicle 100, the processor 830 replaces the common home button with the specific home button. In other words, a home button is displayed, and when a touch is applied to the home button before the fingerprint is input, the common icon list is displayed, and when a touch is applied to the home button after the fingerprint is input, the specific icon list is displayed.

When the occupant gets out, while the common home button or specific home button is being displayed, the displayed home button disappears. In addition, the corresponding display may be switched from an ON state to an OFF state.

The specific icon list (or vehicle home screen page) for the new user may be stored in the memory installed in the vehicle 100 or may be transmitted to and stored in a preset server.

When the specific icon list for the new user is generated, if the new user gets in, a home button in which the specific icon list is set is displayed in the vehicle. Thereafter, when a touch is applied to the home button, icons included in the specific icon list are displayed on the display of the vehicle 100.

In order to select any one icon list, the processor 830 may use various sensors provided within the vehicle 100. In addition, the processor 830 may select the any one icon list on the basis of information received from a mobile terminal (not shown) positioned within the vehicle 100 through communication with the mobile terminal.

For example, when a first occupant gets in the vehicle, the first occupant may transmit an icon list using his mobile terminal to the vehicle 100. The processor 830 may set a specific icon list in the home button on the basis of information received from the mobile terminal. Here, since the same icon list as that provided in the mobile terminal is displayed on the display of the vehicle 100, the first occupant may use, through the vehicle 100, the same function as that which can be executed in his mobile terminal.

Meanwhile, the preset icon list may be varied according to a get-in position within the vehicle. That is, even with the same occupant, an icon list set in the home button may be varied according to in which of seats the occupant is positioned.

When the occupant is positioned in a first seat, the icon list previously set in the home button may include a first icon configured to control an electric/electronic component installed in the first seat or a region adjacent to the first seat.

Also, when the occupant is positioned in a second seat, the preset icon list may include a second icon configured to control an electric/electronic component installed in the second seat or a region adjacent to the second seat, instead of the first icon.

For example, when the occupant gets in a passenger's seat, a passenger seat hot wire icon configured to turn on or off a hot wire installed in the passenger's seat may be included in the icon list, and when the occupant gets in a back seat, a back seat hot wire icon configured to turn on or off a hot wire of the back seat, instead of the passenger seat hot wire icon, may be included in the icon list.

Since an icon list set in the home button is varied according to characteristics of the occupant and/or a get-in position of the occupant, the occupant is not provided with unnecessary information and the occupant may selectively use only an icon essential for him. Accordingly, user convenience may be increased.

Meanwhile, in displaying the home button, the processor 830 may select at least one display on the basis of a position of the occupant or select a partial region of one display. In other words, a position where the home button is displayed may be varied according to positions where the occupant gets in.

In detail, the processor 830 selects at least one display on the basis of a position where the occupant gets in, and controls the communication unit to display the home button on the at least one selected display. The at least one selected display may be varied according to events, and the home button may not be displayed on the other remaining unselected displays.

For example, when the first occupant gets in the passenger's seat, a first home button corresponding to the first occupancy may be displayed on a first display corresponding to the passenger's seat. Also, when the first occupant gets in the back seat, the first home button may be displayed on a second display corresponding to the back seat, rather than on the first display.

The processor 830 may select the number of home buttons on the basis of the event and control the communication unit 810 to display one or more home buttons corresponding to the selected number. That is, each occupant may use an icon list specified for each occupant using a unique home button.

For example, when the first and second occupants get in the vehicle 100 together, the processor 830 controls the communication unit 810 to display a first home button corresponding to the first occupant and a second home button corresponding to the second occupant.

According to the occurrence of the event, the home button may be displayed as at least one display in an OFF state is turned on. The display, which is changed in state from OFF to ON, may be varied according to the event, and the home button is displayed on the displayed which has been changed to the ON state.

On the ON display which has been changed on the ON state, only the home button may be displayed or an icon list set in the home button may be displayed together with the home button.

Thereafter, when a touch is applied to any one icon, an execution screen of an application corresponding thereto is displayed on the ON display and the home button is displayed in a region of the execution screen. With the execution screen displayed, when a touch is applied to the home button, an icon list set in the home button is displayed together with the home button on the ON display.

Meanwhile, the home button may additionally appear on the already turned-on display due to occurrence of the event. In detail, when the event occurs while a predetermined screen is being displayed, the home button may be displayed in a region of the predetermined screen. Thereafter, when a touch is applied to the home button, the predetermined screen disappears and the icon list set in the home button is displayed together with the home button.

Meanwhile, the vehicle control device 800 may be driven differently in case where a plurality of displays provided in the vehicle are controlled and in case where a single display provided in the vehicle is controlled.

First, the case where a plurality of displays are controlled will be described with reference to FIGS. 10A to 10D, and thereafter, the case where a single display is controlled will be described with reference to FIGS. 11A to 13.

FIGS. 10A to 10D illustrate embodiments according to the control method of FIG. 9.

The vehicle 100 may include a plurality of displays.

The plurality of displays are installed in different positions and display different types of information according to positions where the plurality of displays are installed.

The plurality of displays may be classified in type according to positions where the plurality of displays are installed. For example, the plurality of displays may include at least one of a dashboard display 1010, a center information display (CID) 1020, a passenger seat display 1030, a first back seat display 1040 installed on a driver seat sheet to provide information to an occupant placed in the back seat, and a second back seat display 1050 installed on a passenger seat sheet to provide information to an occupant placed in the back seat.

Figure 10A:
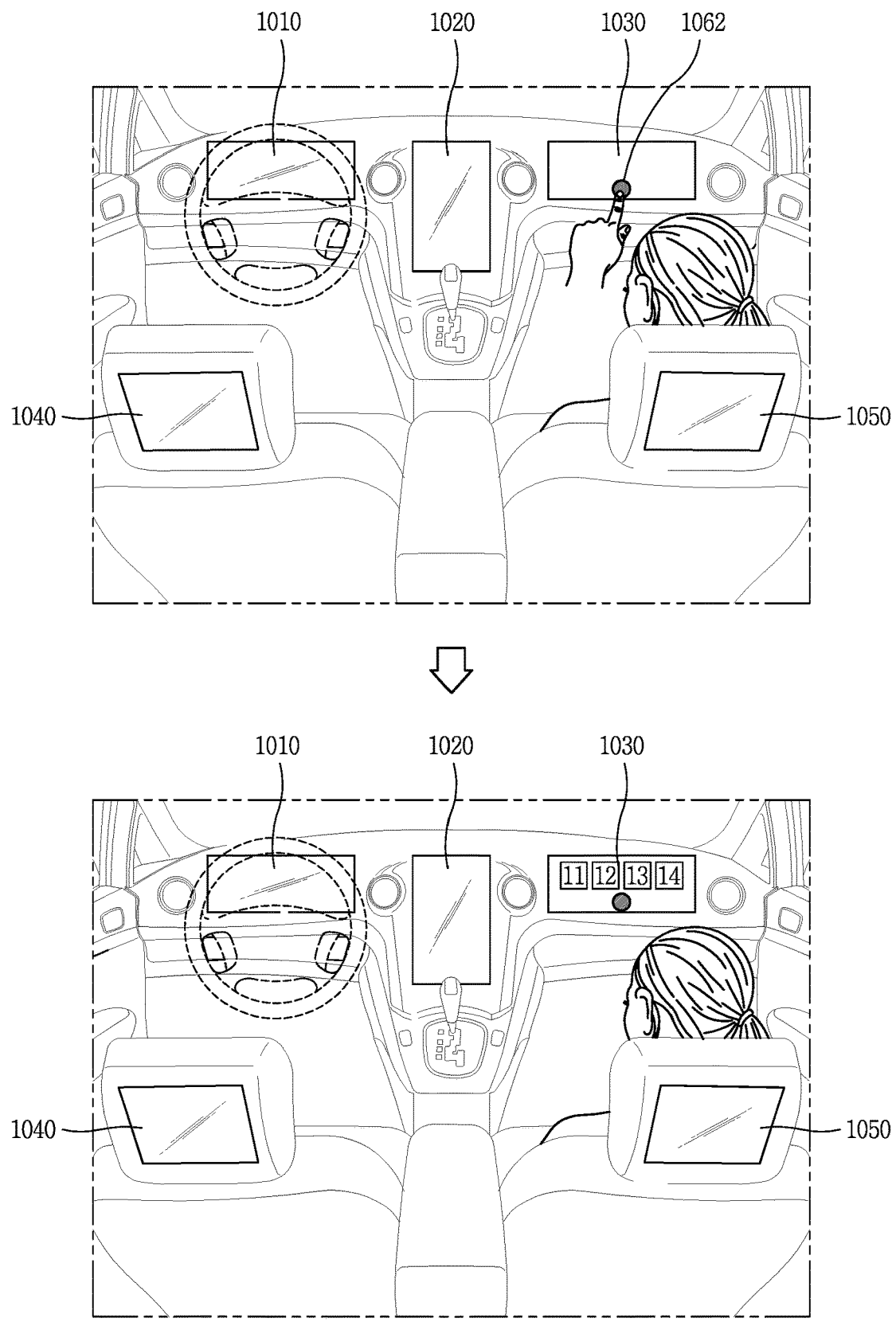
FIGS. 10A to 10D illustrate embodiments according to the control method of FIG. 9.

As illustrated in FIG. 10A, when a female occupant gets in the passenger seat, the processor 830 controls the communication unit 810 to display a first home button 1062 in which a first icon list corresponding to the female occupant is set on the passenger seat display 1030.

The first home button 1062 is configured to control the passenger seat display 1030 on which the first home button 1062 is displayed, among the plurality of displays provided in the vehicle 100.

For example, as illustrated in FIG. 10A, when a touch is applied to the first home button 1062, a first icon list set in the first home button 1062 is displayed on the passenger seat display 1030. When a touch is applied to any one of icons 11, 12, 13, and 14 included in the first icon list, an execution screen of an application corresponding to the touched icon is displayed on the passenger seat display 1030.

Figure 10B:
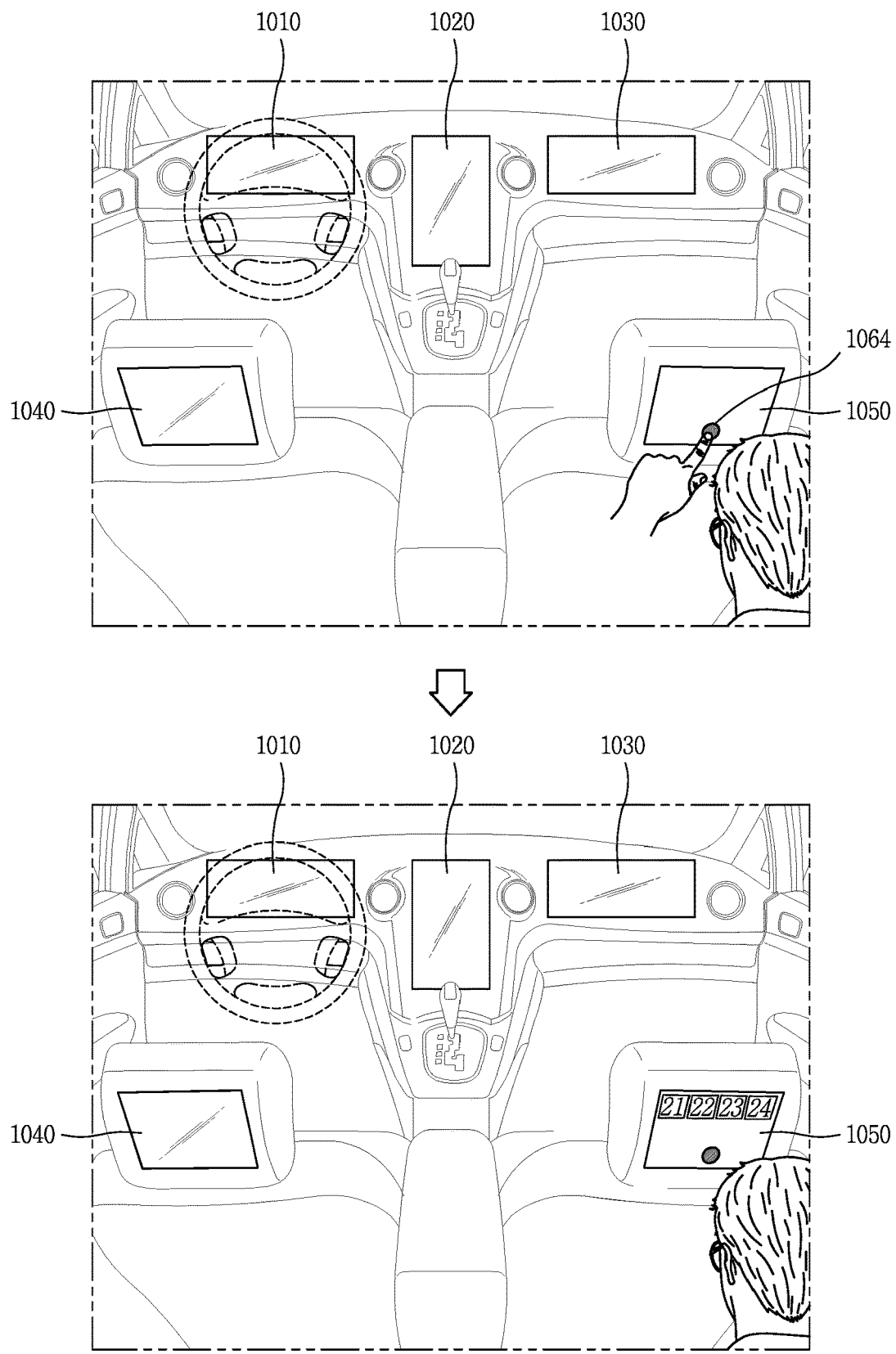

As illustrated in FIG. 10B, when a male occupant gets in the second back seat, the processor 830 controls the communication unit 810 to display a second home button 1064 in which a second icon list corresponding to the male occupant is set on the second back seat display 1050.

When a touch is applied to the second home button 1064, a second icon list set in the second home button 1064 is displayed on the second back seat display 1050. When a touch is applied to any one of icons 21, 22, 23, and 24 included in the second icon list, an execution screen of an application corresponding to the touched icon is displayed on the second back seat display 1050.

Figure 10C:
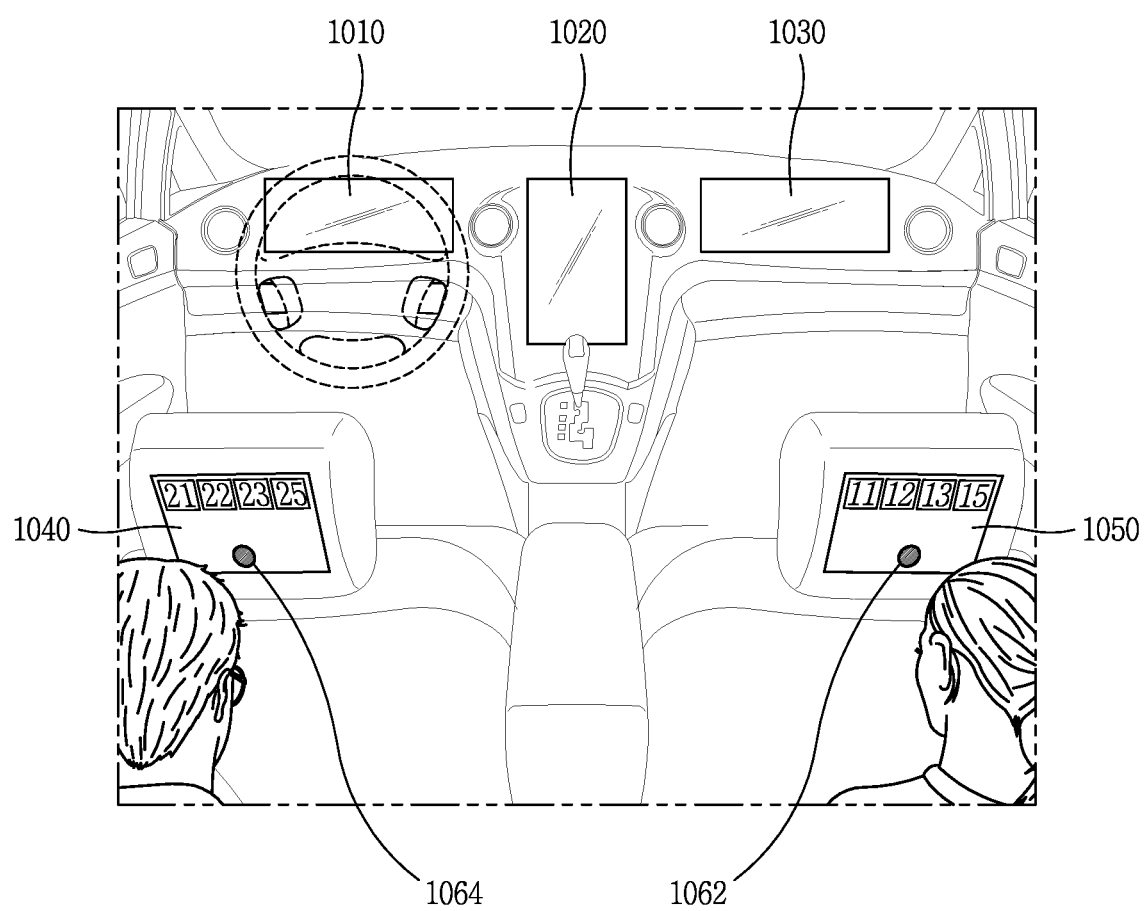

As illustrated in FIG. 10C, in case where a male occupant gets in the first back seat and a female occupant gets in the second back seat, the processor 830 may display the second home button on the first back seat display 1040 and the first home button on the second back seat display 1050.

Even with the same occupant, the icon list set in the home button may be changed according to seat positions where the occupant gets in. For example, when the female occupant gets in the passenger's seat as illustrated in FIG. 10A, icon #14 related to the passenger's seat may be included in the first icon list of the first home button 1062. Meanwhile, when the female occupant gets in the second back seat as illustrated in FIG. 10, icon #15, instead of the icon #14, may be included in the first icon list.

A home button in which different icon lists are set may be displayed on a specific display according to characteristics of the occupant and/or get-in positions of the occupant. Various screens may be displayed according to user inputs applied to the home button, and the various screens may be display only on a specific display. That is, the home button is configured to control the specific display.

For example, the first home button displayed on the first display may be configured to change a screen displayed on the first display, and the second home button displayed on the second display may be configured to change a screen displayed on the second display.

Meanwhile, a position where the home button is displayed may be varied according to an occupant present in the vehicle 100.

Figure 10D:
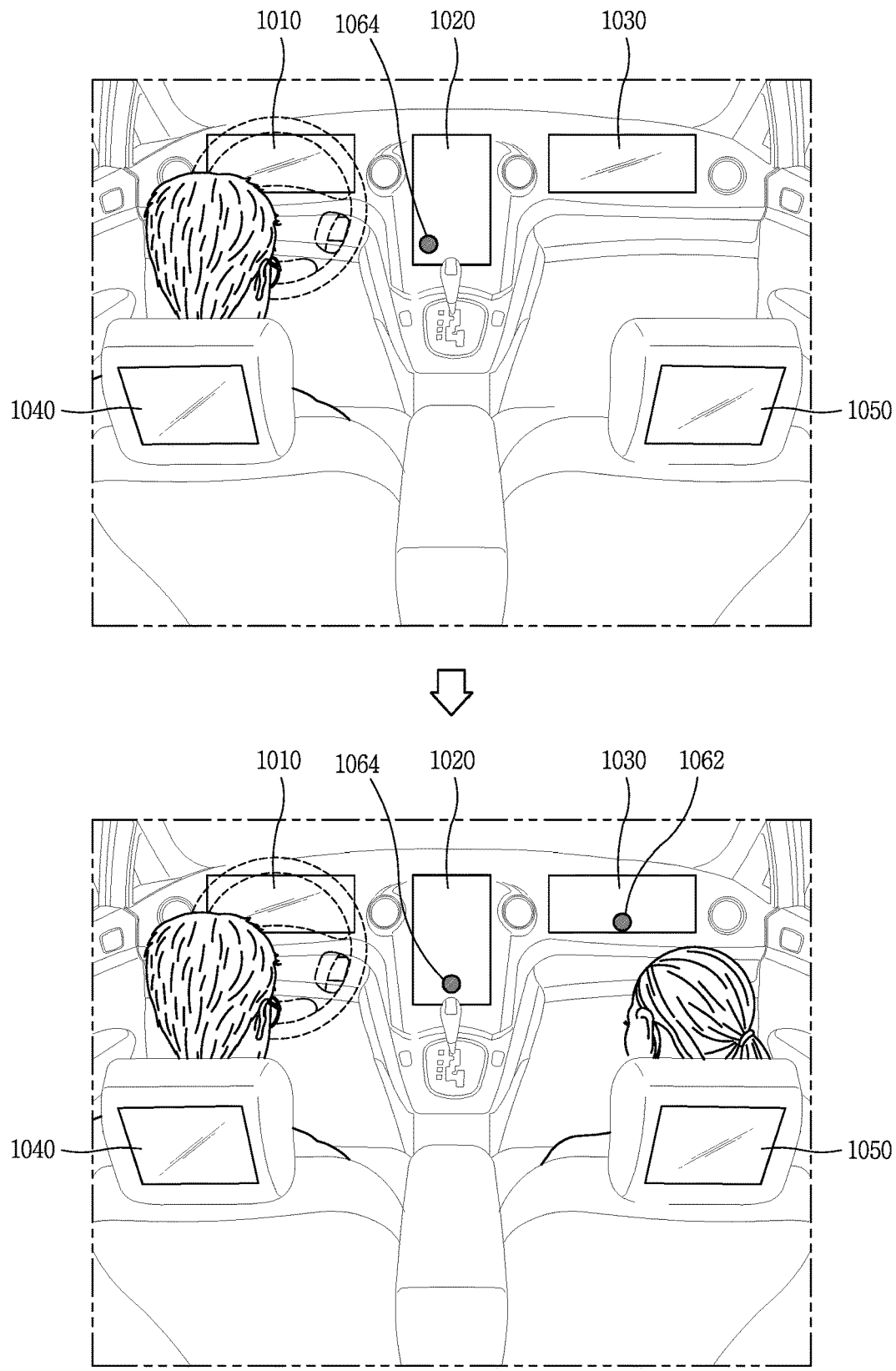

For example, in case where a male occupant gets in the driver's seat as illustrated in FIG. 10D, the second home button 1064 may be displayed on the center fascia display 1020. Here, the second home button 1064 may be displayed at a point close to the driver's seat (or at an edge close to one end of the center fascia display) of edge regions of the center fascia display 1020 such that the driver may apply a touch thereto.

Thereafter, when a female occupant gets in the passenger's seat, the first home button 1062 may be displayed on the passenger seat display 1030, and the second home button 1064 may be displayed in a middle region between one end and the other end of the center fascia display 1020 such that both the male occupant and the female occupant may apply a touch thereto.

Since the center fascia display 1020 is a display which can be used by both the male occupant and the female occupant, the processor 830 may display a third home button in which a third icon list is set, on the center fascia display 1020, instead of the second home button 1064. Here, the third icon list refers to an icon list initially set when the vehicle 100 is released, i.e., a basic icon list which has not been personalized.

Meanwhile, when an event occurs, the processor 830 may control a single display in different manners.

FIGS. 11A to 13 are conceptual views illustrating the control method of FIG. 9 using a single display provided in a vehicle.

Figure 11A:
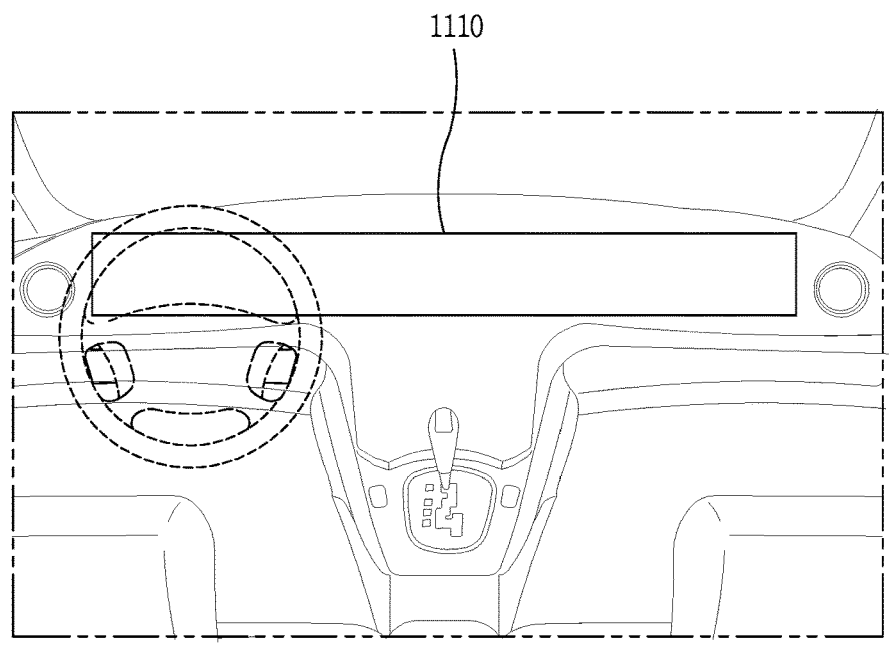
FIGS. 11A to 13 are conceptual views illustrating the control method of FIG. 9 using one display provided in a vehicle.

For example, as illustrated in FIG. 11A, a single dashboard display 1110 extending from a left end of the vehicle 100 to a right end thereof may be provided in a dashboard of the vehicle 100. The processor 830 may control any one of a plurality of displays provided in the vehicle 100 in different manners, but for the purposes of description, a case where the any one display is the dashboard display 1110 will be described as an example.

When an occupant gets in the vehicle 100, the processor 830 may divide the dashboard display 1110 into a plurality of regions. At least one of the number, positions, and sizes of the divided regions may be varied according to at least one of characteristics of the occupant and a get-in position of the occupant.

Figure 11B:
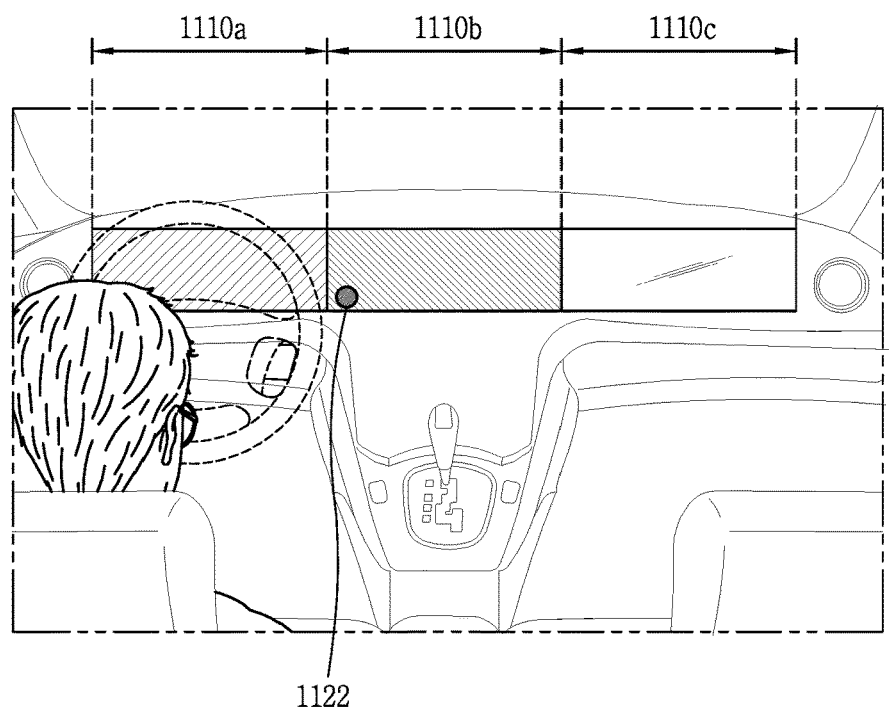

For example, as illustrated in FIG. 11B, the dashboard display 1110 may be divided into a dashboard region 1110a, a center fascia region 1110b, and a passenger seat region 1110c.

Since the driver cannot use the passenger seat region 1110c, the processor 830 controls the passenger seat region 1110c to be turned off. Essential information required for driving may be displayed in the dashboard region 1110a, and auxiliary information may be displayed in the center fascia region 1110b. Also, a first home button 1122 may be displayed in the center fascia region 1110b.

As described above with reference to FIG. 9, different icon lists may be set in the first home button 1122 according to characteristics of the occupant.

Meanwhile, when a first occupant and a second occupant get in the vehicle, the processor 830 may control the dashboard display 1110 to display a first home button corresponding to the first occupant and a second home button corresponding to the second occupant.

Figure 11C:
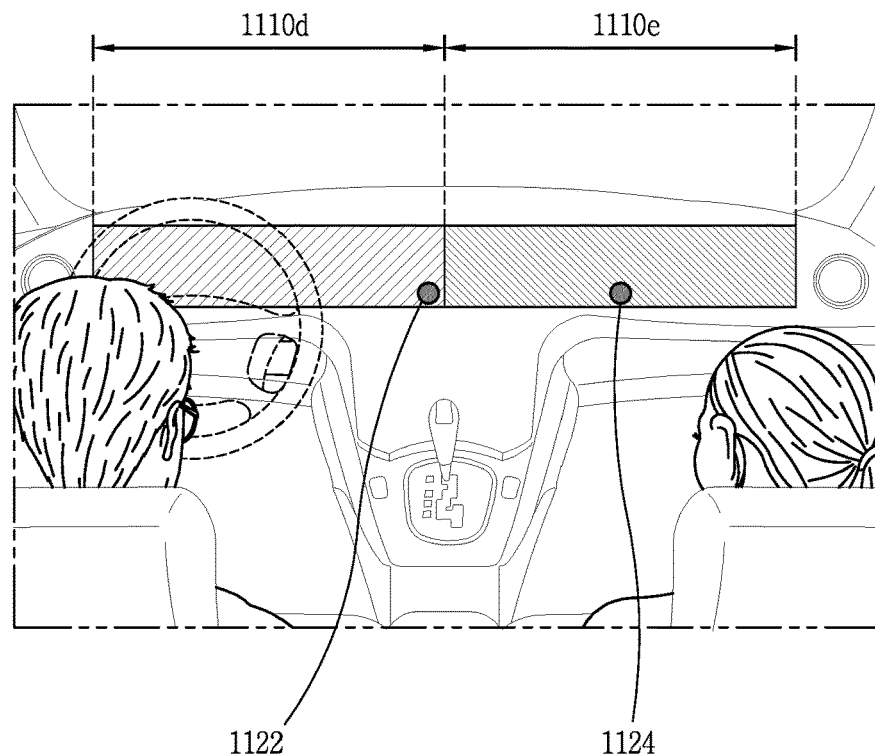

For example, as illustrated in FIG. 11C, in case where first and second home buttons 1122 and 1124 are displayed on the dashboard display 1110, the dashboard display 1110 may be divided into a first region 1110d displaying a first screen and a second region 1110e displaying a second region.

Figure 11D:
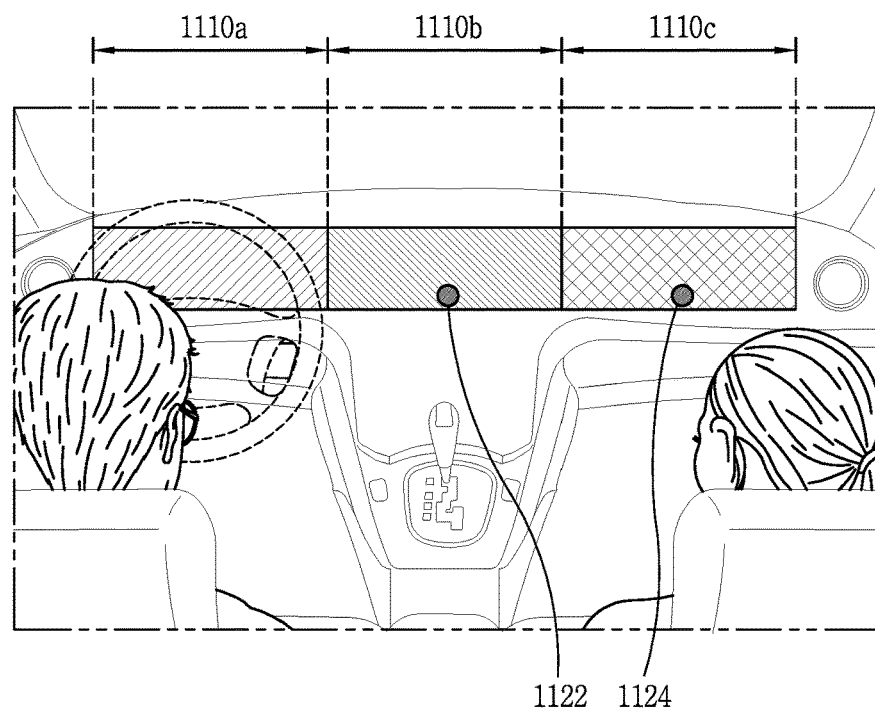

In another example, as illustrated in FIG. 11D, the dashboard display 1110 may be divided into the dashboard region 1110a, the center fascia region 1110b displaying the first home button 1122, and the passenger seat region 1110c displaying the second home button 1124.

Here, the first home button 1122 may be configured to change the first screen of the first region 1110d, and the second home button 1124 may be configured to change the second screen of the second region 1110e.

Figure 12A:
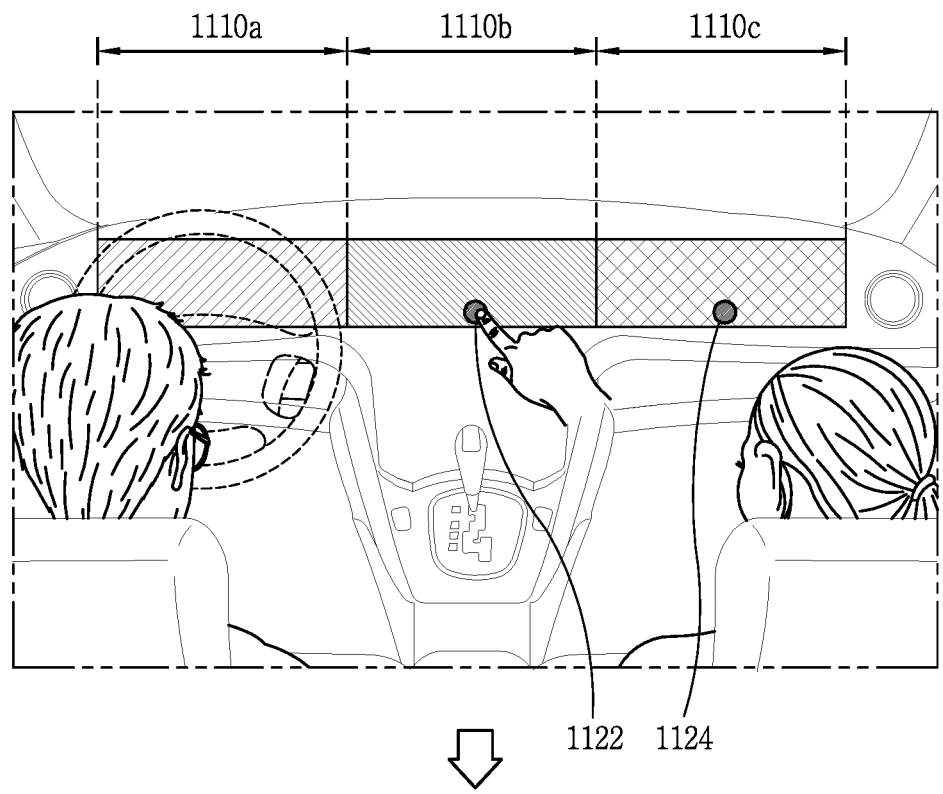
Figure 12A:
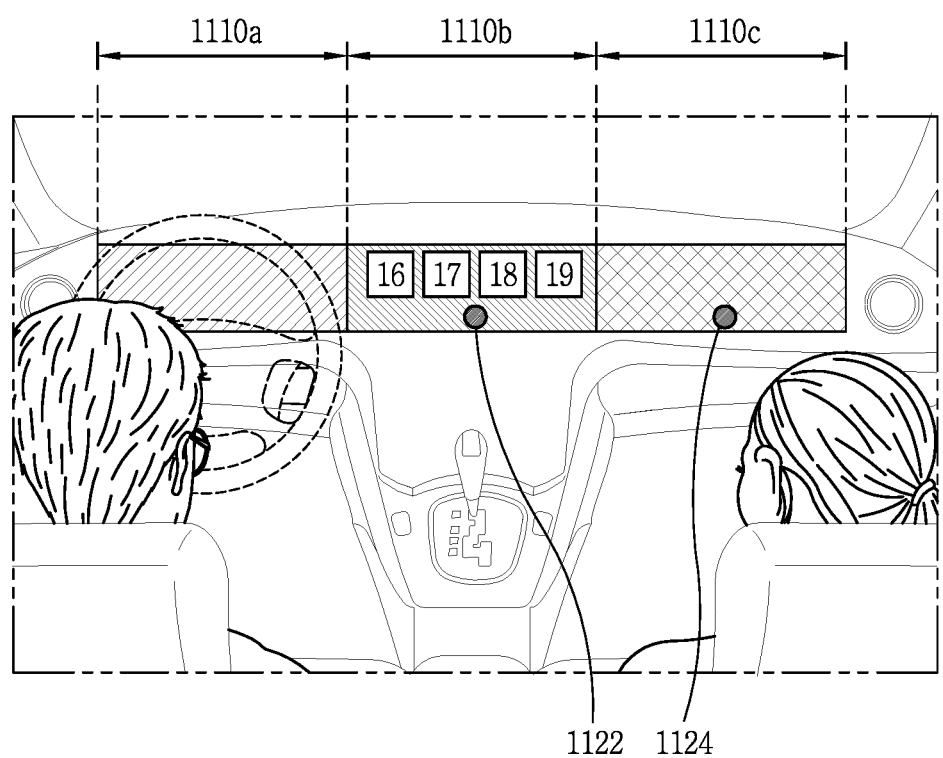

For example, as illustrated in FIG. 12A, when a touch is applied to the first home button 1122, a first icon list set in the first home button 1122 is displayed in the center fascia region 1110b.

One display may be divided into a plurality of regions by a preset value always in the same manner or may be divided in different manners according to occupants.

Even in case where one display is divided into a plurality of regions by a preset value, set values may be varied according to at least one of characteristics of an occupant and a get-in position of the occupant.

In case where one display is divided into a plurality of regions in different manners according to occupants, the number of regions may be determined by a set value set by a specific occupant, and a size and a position of each region are determined. For example, in case where a specific occupant sets five regions, when the specific occupant gets in the vehicle, the dashboard display 1110 may be divided into five regions and different home buttons for controlling the respective regions may be displayed on the respective regions.

Since the divided regions 1110a to 1110c individually operate, a touch applied to the first home button 1122 does not affect the dashboard region 1110a and the passenger seat region 1110c. In other words, in case where a touch is applied to the first home button 1122, information displayed in the center fascia region 1110b may be changed, but information displayed in the dashboard region 1110a and the passenger seat region 1110c is maintained as is.

When a touch is applied to any one of icons 16, 17, 18, and 19 included in the first icon list, an execution screen of an application corresponding to the any one icon may be displayed in the center fascia region 1110b.

Figure 12B:
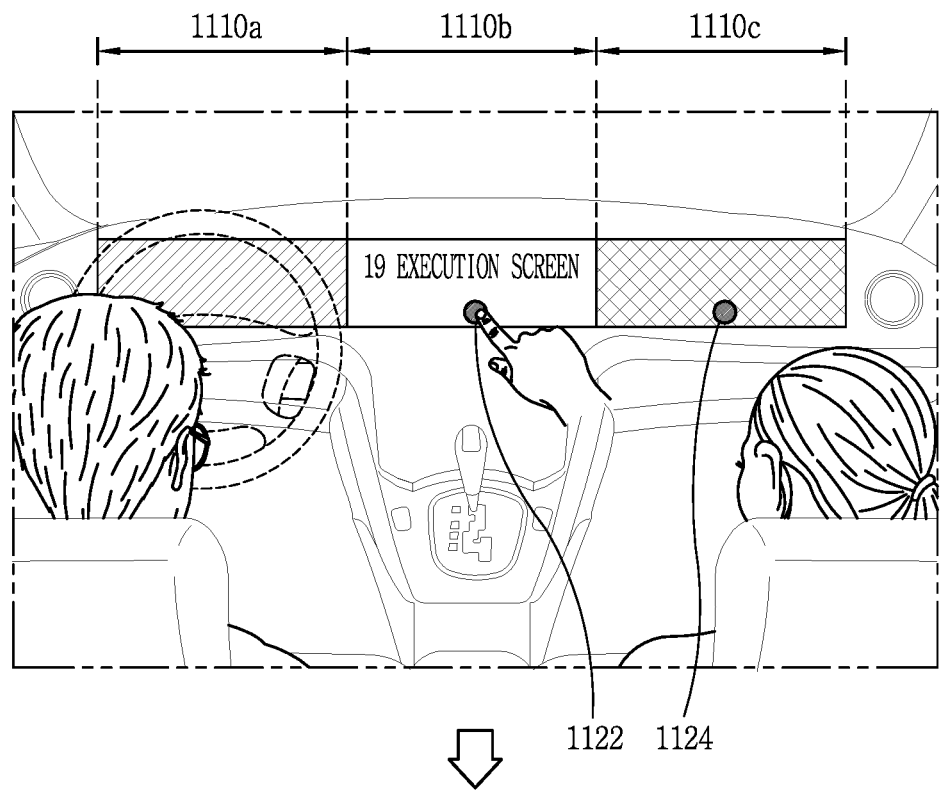
Figure 12B:
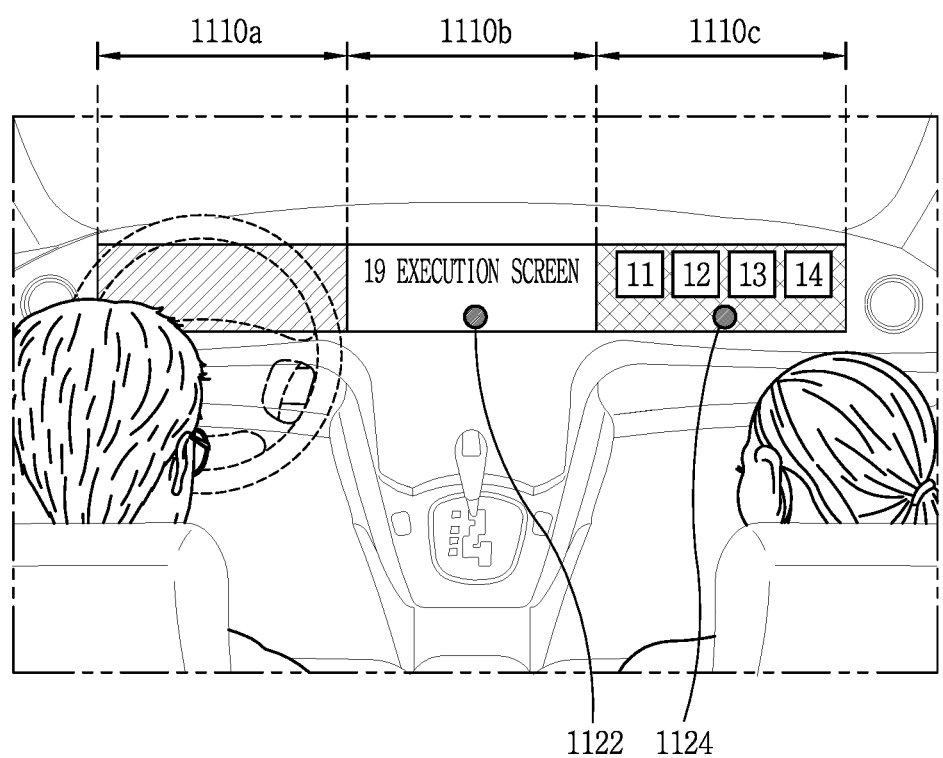

Similarly, as illustrated in FIG. 12B, when a touch is applied to the second home button 1124 displayed in the passenger seat region 1110c, a second icon list set in the second home button 1124 is displayed in the passenger seat region 1110c.

Meanwhile, in case where a drag input is applied to any one of the first and second home buttons 1122 and 1124, the any one home button may be moved according to the drag input and the center fascia region 1110b and the passenger seat region 1110c may be varied according to a position of the any one home button. In other words, the display may be re-divided using movement of the home button.

Figure 13:
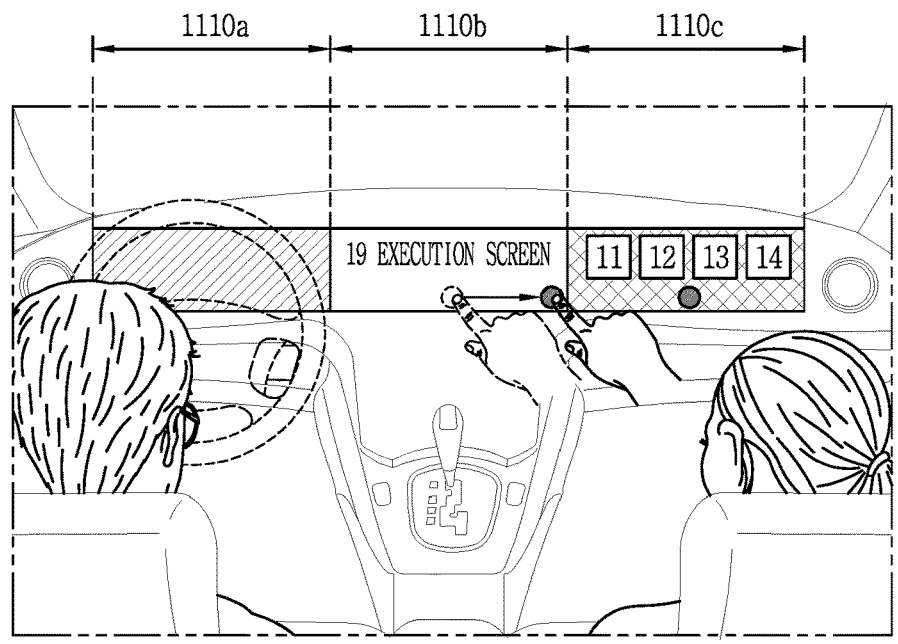
Figure 13:
Figure 13:
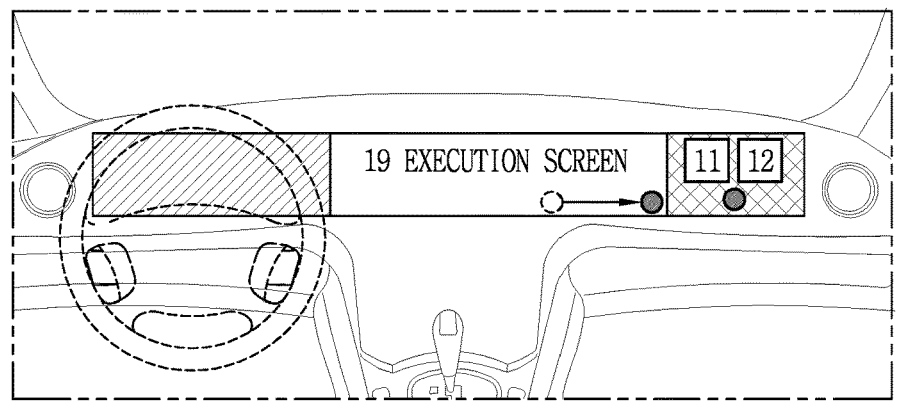
Figure 13:
Figure 13:
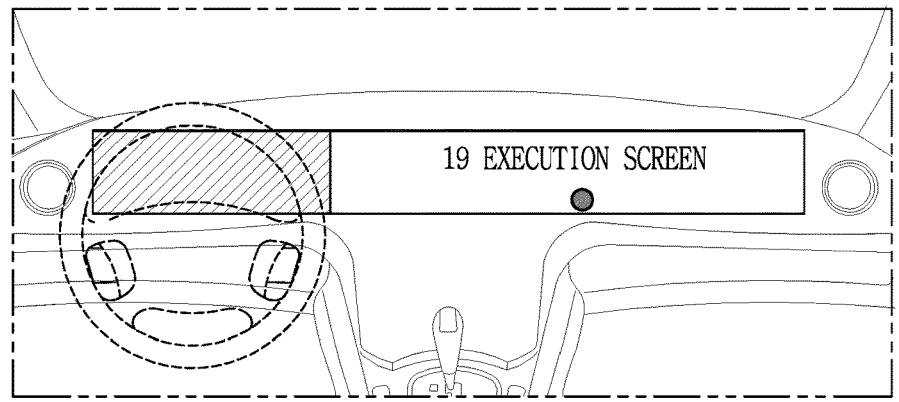

Referring to FIG. 13, the first home button 1122 is moved according to a drag input applied thereto and a display position of the first home button 1122 is varied.

When the drag input is moved to overpass the center fascia region 1110b to the passenger seat region 1110c, the processor 830 resets the center fascia region 1110b and the passenger seat region 1110c according to the drag input. As the regions are reset, information displayed in each region is also changed.

Meanwhile, in case where the first home button 1122 is positioned within a predetermined distance from the second home button 1124 according to the drag input, the processor 830 may control the communication unit 810 such that the second home button 1124 disappears. In addition, the processor 830 controls the communication unit 810 such that the second screen which has been displayed in the passenger seat region 1110c disappears and the first screen which has been displayed in the center fascia region 1110b is displayed both in the center fascia region 1110b and the passenger seat region 1110c. In other words, the divided regions are incorporated, the screen which has been displayed in any one region may extend to be displayed in the incorporated region.

Although not shown, a boundary demarcating regions forming the dashboard display 1110 may be displayed on the dashboard display 1110. The processor 830 may adjust a size of at least one of the regions on the basis of a touch input applied to the boundary and change display of at least one of the first and second home buttons according to the adjusted size.

In this manner, the vehicle control device according to the present disclosure may divide one display into a plurality of regions by displaying a plurality of home buttons on the one display. Occupants may execute various functions using a display region given to them using a unique home button given to them. Also, since regions may be reset using the home button, user convenience may be increased.

So far, the examples in which the event occurs when an occupant gets in the vehicle have been described.

Meanwhile, the event for displaying the home button may also occur according to a home button generation command of a person who has corresponding authority, rather than as an occupant gets in the vehicle 100.

The person who has authority to generate a home button is defined as a person who has highest authority with respect to the vehicle 100, and may be a person who remotely controls the vehicle 100 or a driver of the vehicle 100. For the purposes of description, a case in which the home button generation command is generated by the driver will be described.

Figure 14:
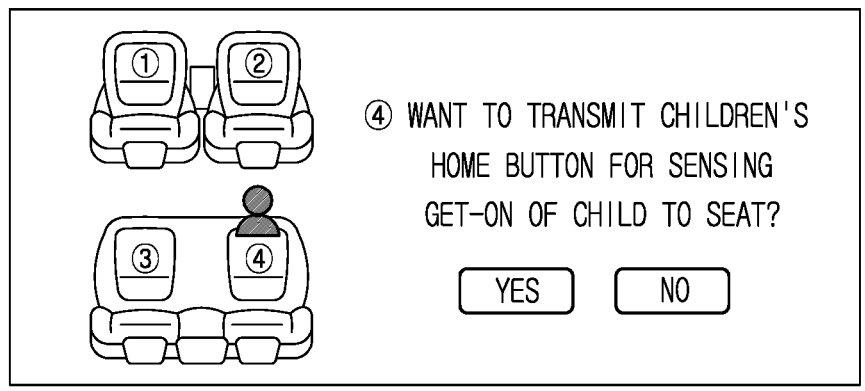
FIG. 14 is a view illustrating a user interface provided to a driver.

FIG. 14 is a view illustrating a user interface provided to a driver.

The driver may input the home button generation command using an input unit provided in the vehicle 100.

For example, the home button generation command may be generated when a button provided in a steering wheel is input in a preset manner or when a voice command is input through a microphone provided in the vehicle 100.

In another example, a user interface for generating the home button generation command may be provided and the home button generation command may be generated on the basis of a user input through the user interface.

Also, in another example, in case where a request for diving one display is input, the one display may be divided into at least two or more regions according to the dividing request. The dividing request may correspond to the home button generation command, and different home buttons may be displayed in each region. For example, when a request for dividing one display into three regions is input, the one display may be divided into three regions and three home buttons in which different icon lists are set may be displayed in the three regions, respectively.

The driver may input the number of home buttons to be generated using the user interface provided in the processor 830.

In case where a plurality of displays are provided in the vehicle 100, the processor 830 may select displays corresponding to the input number of home buttons on the basis of a total number of occupants present within the vehicle 100 and get-in positions of the occupants. For example, when the input number of home buttons is 2, two displays may be selected. Also, the processor 830 may display home buttons corresponding to the input number on the selected displays, respectively.

In case one display is selected, the processor 830 may divide the selected display into regions greater than or equal to the input number of home buttons. Also, the one or more home buttons may be displayed in different regions of the selected display. For example, in case where the driver inputs 2 as the number of home buttons to be generated, the selected display may be divided into at least two regions and first and second home buttons may be displayed in different regions, respectively.

Here, the different regions refer to spaces individually controlled by the respective home buttons. For example, in case where the first and second home buttons are displayed on any one display, when a touch is applied to the first home button, screen information only in a first region of the display may be changed, while screen information displayed in a second region is maintained as is. In other words, the first region and the second region, regions in which different types of information are displayed, are demarcated as they have different types of user graphic interfaces (GUIs).

A position in which each home button is displayed in each region may be varied according to a total number of occupants present within the vehicle 100 and a get-in position of each occupant. A position in which each occupant may easily touch a home button of each occupant may be previously set or may be calculated by a preset algorithm. The processor 830 may display each home button in a position previously set or calculated by the preset algorithm.

Meanwhile, as illustrated in FIG. 14, when an occupant gets in, the processor 830 may display announcement information (or notification information) indicating at least one of characteristics of the occupant and a get-in position of the occupant on at least one display.

In addition, any one home button for the occupant, among preset home buttons, may be proposed.

For example, in case where a child gets in the second back seat, a "children's home button" may be proposed as a home button to be displayed on the second back seat display. In case where the children's home button is selected by a driver's input, the processor 830 controls the communication unit 810 to display the children's home button on the second back seat display.

Although not shown, the processor 830 may also provide a user interface for setting a home button and an icon list corresponding to the home button. IN other words, in case where the "children's home button" proposed by the processor 830 is not selected, a user interface for generating a new home button or editing a previously set home button may be provided. The driver may edit at least one of a type of a home button, a type of an icon included in an icon list, a type of a display for displaying the home button, and a display position of the home button using the user interface provided by the processor 830.

As a result, the processor 830 may control the communication unit 810 such that at least one home button is displayed on one or more displays in response to the home button generation command generated by the driver.

Since the occupant may execute a function only within the icon list set in the home button, there is a limitation in a function which can be executed by the occupant. Thus, the driver may give different authority to each occupant.

Meanwhile, the driver may collect home buttons displayed on the one or more displays. Here, collecting refers to removing the home button from the display.

Figure 15:
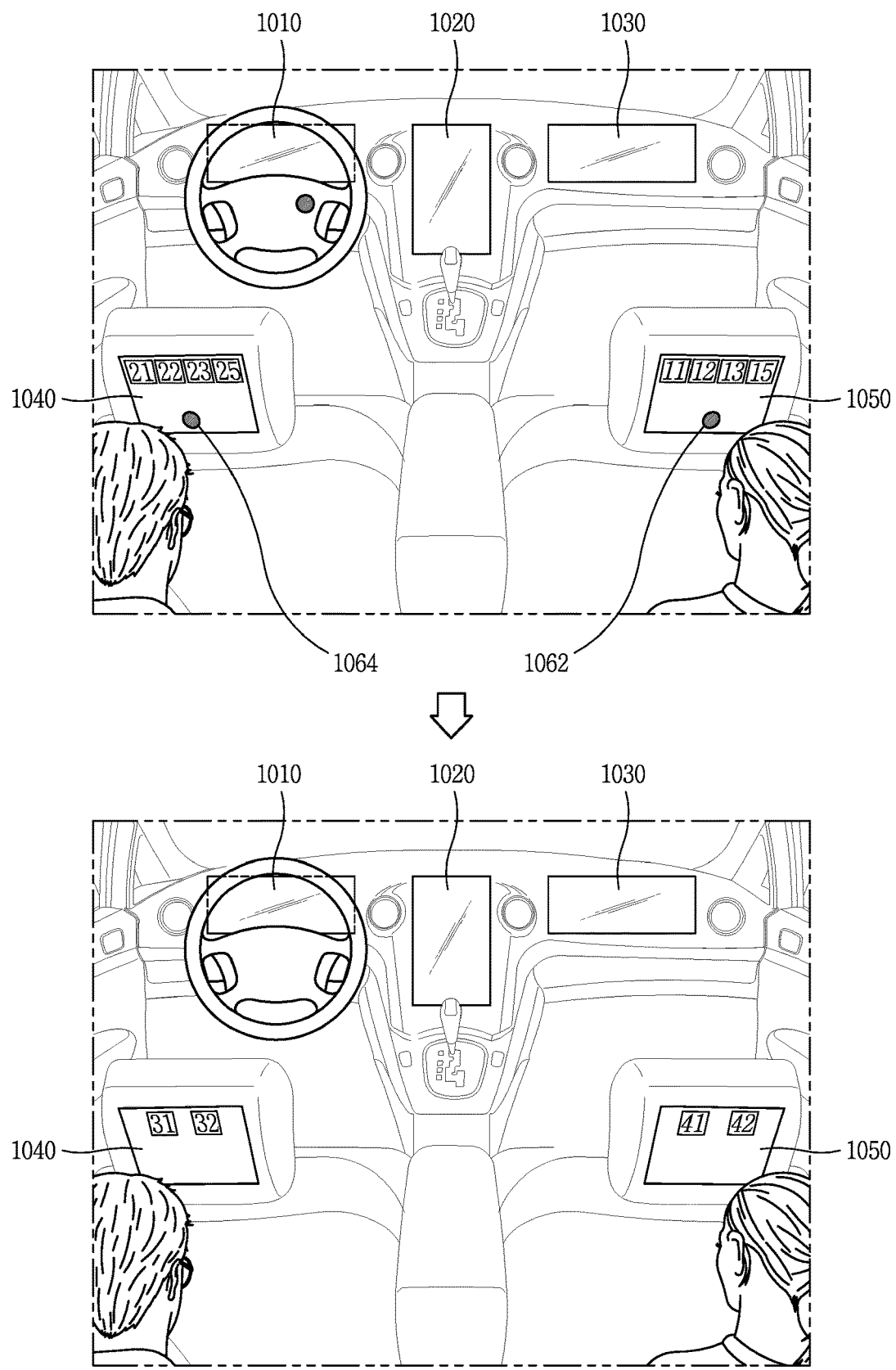
FIG. 15 is a conceptual view illustrating an example of removing a home button.

FIG. 15 is a conceptual view illustrating an example in which a home button is removed.

Referring to FIG. 15, a second home button 1064 corresponding to a mal occupant may be displayed on the first back seat display 1040 and a first home button 1062 corresponding to a female occupant may be displayed on the second back seat display 1050. The male occupant may control a screen output on the first back seat display 1040 using the second home button 1064, and the female occupant may control a screen output on the second back seat display 1050 using the first home button 1062.

Meanwhile, the driver may terminate different functions executed by the occupants present within the vehicle 100 using the home buttons unique thereto. Also, the driver may remove the home buttons to interrupt execution of an additional function.

In detail, when a home button removal command is input from the driver, the processor 830 may control the communication unit 810 such that home buttons displayed on the one or more displays are removed.

An icon list including various icons is set in the home button, and since the home button itself is not displayed, access to the icons is fundamentally interrupted.

Here, the home button removal command may be input by the driver and may be generated when a button provided in the steering wheel of the vehicle is input in a preset manner or a menu corresponding to the home button removal command is selected.

In addition, the processor 830 may control the communication unit 810 such that a screen displayed on each display is removed in response to the home button removal command. Only an icon of a function permitted to be executed in each seat may be displayed in each display. For example, only basically executable icons such as a temperature adjustment icon, an air volume adjustment icon, or a back adjustment icon may be displayed on each display.

Figure 16A:
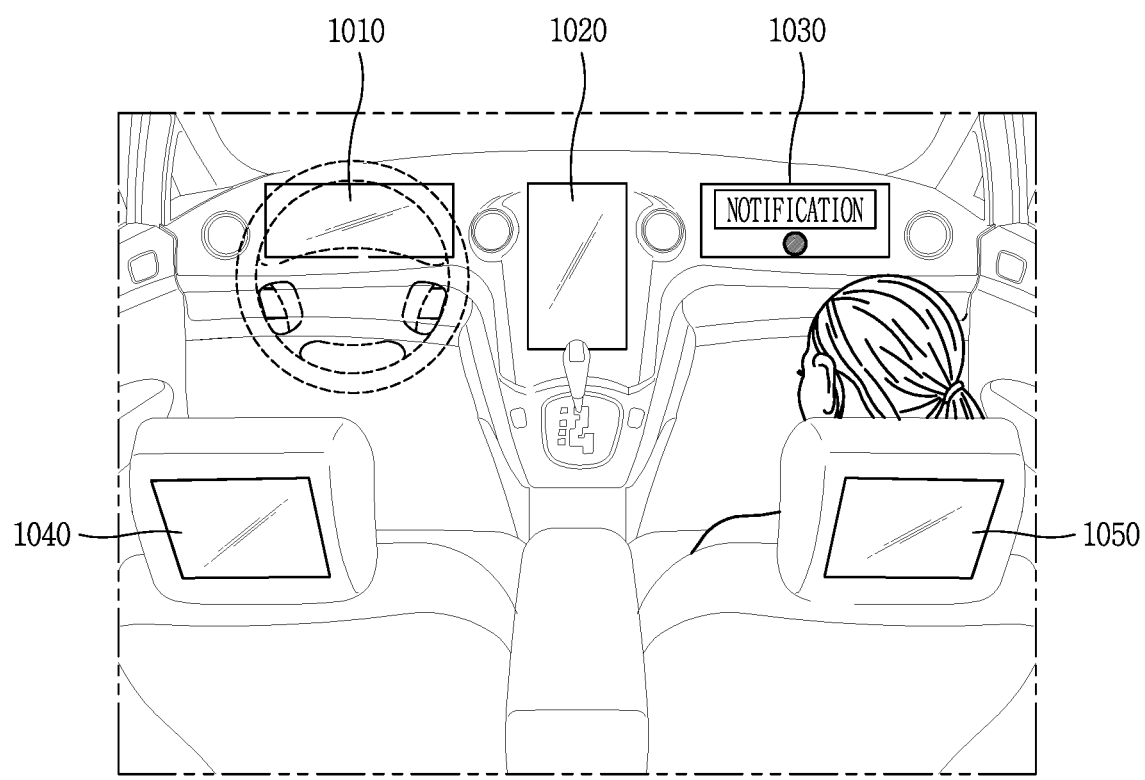
FIGS. 16A and 16B are conceptual views illustrating a method for outputting information that occupants should commonly view.
Figure 16B:
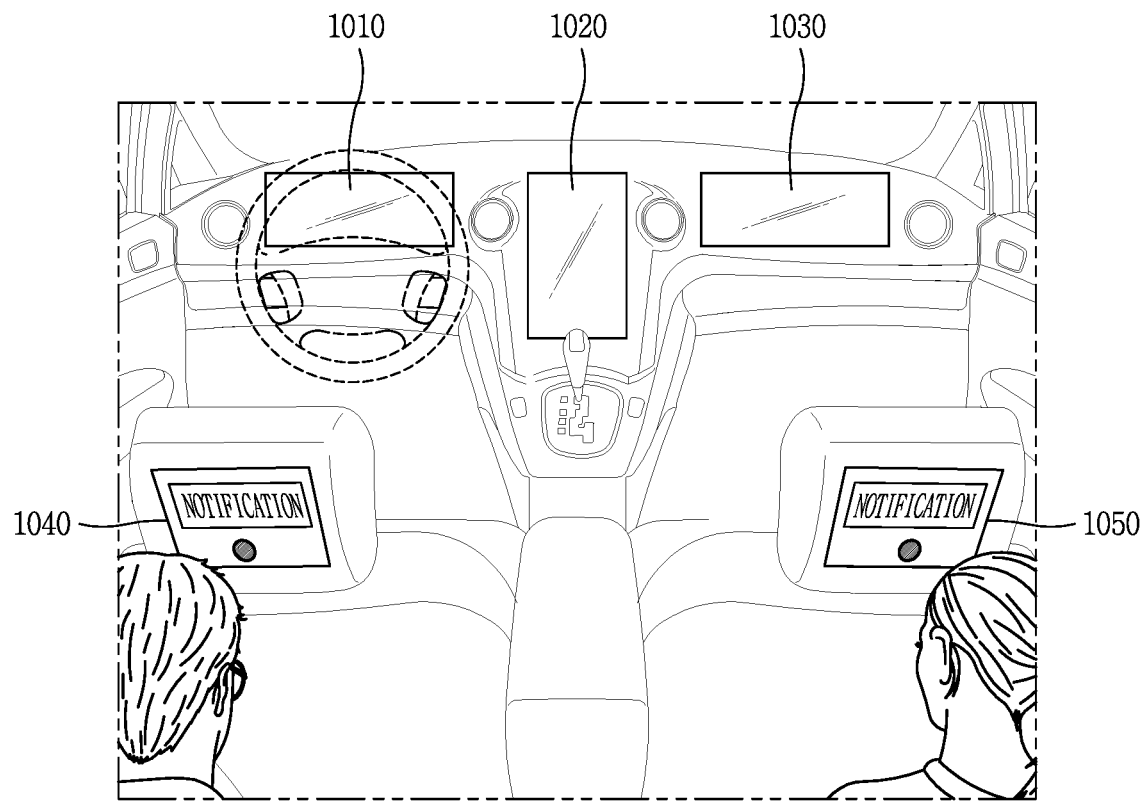

FIGS. 16A and 16B are conceptual views illustrating a method for outputting information that occupants should commonly view.

The vehicle 100 directly affects safety of an occupant, and thus, in case of a specific incident, it is required to provide corresponding information to every occupant present within the vehicle 100. For example, in case where emergency braking is made, a message regarding the emergency braking is required to be provided to every occupant, and in case where a specific component has a fault, a message regarding the fault should be provided to every occupant.

When vehicle driving information meets a preset condition, the processor 830 displays a pop-up window, and here, the processor 830 may select the number of pop-up windows and displays to be displayed respectively in the pop-up windows. IN detail, the processor 830 controls the communication unit 810 to display one or more pop-up windows corresponding to the number of home buttons displayed on the one or more displays.

For example, in case where two home buttons are displayed, two pop-up windows may be displayed, and in case where five home buttons are displayed, five pop-up windows may be displayed.

Each pop-up window is displayed in a position adjacent to a home button corresponding thereto. In other words, each pop-up window may be displayed on a display or region in which each home button is displayed.

For example, when a first home button is displayed on a first display, and a second home button is displayed on a second display, a first pop-up window may be displayed on the first display, and a second pop-up window may be displayed on the second display. In another example, in case where the first home button is displayed in the first region of the first display and the second home button is displayed in a second region of the first display, the first pop-up window may be displayed in the first region and the second pop-up window may be displayed in the second region.

This is to prevent a pop-up window from being displayed in an unnecessary position because occupants may not get on every seat.

For example, as illustrated in FIG. 16A, in case where a female occupant gets in the passenger's seat, the first home button 1062 may be displayed on the passenger seat display 1030. In this state, when a pop-up window is displayed, one pop-up window may be displayed on the passenger seat display 1030 and may not be display on any other display.

In another example, as illustrated in FIG. 16B, when a male occupant gets in the first back seat and a female occupant gets in the second back seat, the second home button 1064 may be displayed on the first back seat display 1040 and the first home button 1062 may be displayed on the second back seat display 1050. In this state, when a pop-up window is displayed, first and second pop-up windows may be displayed on the first back seat display 1040 and the second back seat display 1050, respectively.

Meanwhile, the vehicle control device 800 according to the present disclosure may obtain an icon list from the outside and provide a home button in which the obtained icon list is set.

Figure 17:
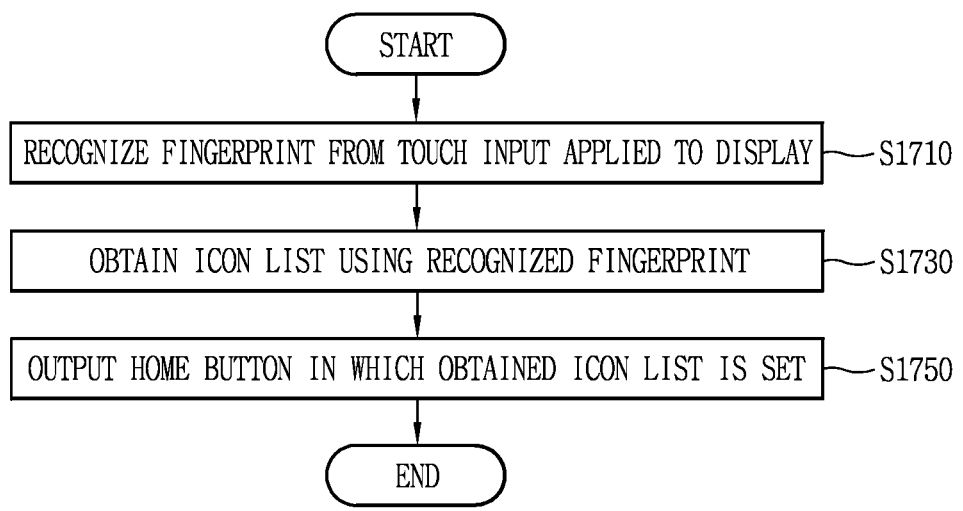
FIG. 17 is a flow chart illustrating a control method of providing a home button using a fingerprint.
Figure 18:
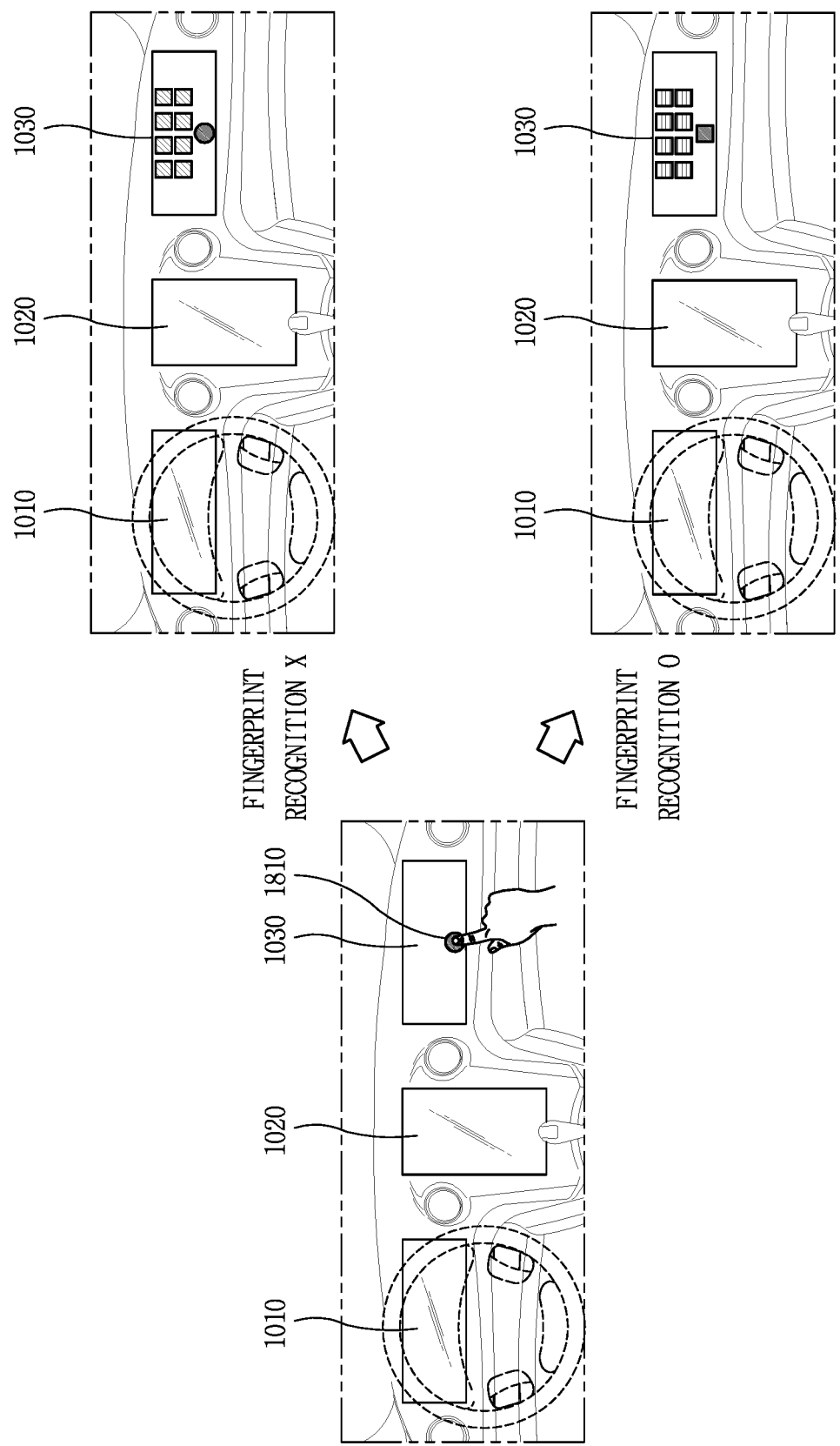
FIG. 18 is a conceptual view illustrating an embodiment according to the control method of FIG. 17.

FIG. 17 is a flow chart illustrating a control method of providing a home button using a fingerprint, and FIG. 18 is a conceptual view illustrating an embodiment according to the control method of FIG. 17.

The display provided in the vehicle 100 is configured as a touch screen capable of recognizing a touch, and may also be configured as a fingerprint recognition touch screen capable of recognizing a fingerprint included in the touch.

The processor 830 may recognize a fingerprint from a touch input applied to the fingerprint recognition touch screen (S1710). In detail, when a touch is applied to the fingerprint recognition touch screen, the processor 830 may receive a fingerprint image extracted from the fingerprint recognition touch screen.

Thereafter, the processor 830 may obtain an icon list using the recognized fingerprint (S1730).

For example, the vehicle 100 may have a memory (not shown) storing a fingerprint and an icon list corresponding to the fingerprint. The processor 830 may search and obtain a matched icon list from the memory using the fingerprint image.

In another example, the processor 830 may transmit or broadcast the fingerprint image to terminals positioned within the vehicle 100 or a preset server.

Upon receiving the fingerprint image, a mobile terminal may determine whether the fingerprint image matches a fingerprint of the user stored in a memory thereof, and when the fingerprint image matches the user's fingerprint, the mobile terminal may transmit an icon list stored in the memory of the mobile terminal to the vehicle 100. The icon list stored in the memory may be particularly set for the vehicle or may be a first page among home screen pages of the mobile terminal or may be any one page most frequently used by the user, among the home screen pages. This is to allow the user of the mobile terminal to use an application used in the mobile terminal as is in the vehicle 100.

When the fingerprint image is transmitted to the preset server, the server may search for an icon list matched to the fingerprint image from a database, and transmit a searched icon list to the vehicle 100.

In other words, the processor 830 may obtain an icon list matched to the fingerprint image from the mobile terminal positioned within the vehicle 100 or the preset server using the fingerprint image.

Thereafter, the processor 830 may output a home button in which the obtained icon list is set (S1750).

For example, in case where an event occurs as an occupant gets in the passenger seat of the vehicle 100, the processor 810 may control the communication unit 810 such that a home button corresponding to the occupant is displayed on the passenger seat display. It may be set such that a first icon list is displayed in the home button. In other words, when a touch is applied to the home button, the first icon list may be displayed on the passenger seat display.

In a state in which the first icon list is set to be displayed in the home button, when a touch input is applied to the home button or the passenger seat display, the processor 830 may recognize a fingerprint from the touch input. In case where a second icon list matched to the recognized fingerprint is obtained, the processor 830 may change a setting of the home button such that the second icon list is displayed.

That is, when a touch is applied to the home button after fingerprint recognition is performed, the second icon list, rather than the first icon list, is displayed on the passenger seat display.

When an icon list is obtained from the mobile terminal, the processor 830 may perform synchronization with the mobile terminal. Also, sharing information stored in the mobile terminal, the processor 830 may display the information stored in the mobile terminal on the display of the vehicle 100 or may perform inter-device screen function replication using a mirror link technology.

As illustrated in FIG. 18, a touch input may be applied to the home button 810 in a state in which a home button 1810 is displayed on the passenger seat display 1030. Here, it is assumed that a first icon list is previously set in the home button 1810.

Unless a second icon list is obtained from a fingerprint recognized from the touch input, the processor 830 displays the first icon list on the passenger seat display 1030 in response to the touch input.

In case where the second icon list is obtained, the processor 830 displays the second icon list on the passenger seat display 1030 in response to the touch input.

Meanwhile, when the fingerprint is recognized, the processor 830 may change the home button from a first shape to a second shape. This is to inform the user that fingerprint recognition has been properly performed.

Meanwhile, the present invention may extend even to the vehicle 100 having the vehicle control device 1800 described above with reference to FIGS. 8 to 18.

The present invention described above may be implemented as a computer-readable code (or application or software) in a medium in which a program is recorded. The method for controlling an autonomous driving vehicle may be realized by a code stored in a memory, or the like.

The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device configured to control one or more displays located in a vehicle, the vehicle control device comprising:
   a communication unit configured to communicate with the one or more displays; and
   at least one processor configured to:
      based on an occurrence of an event, control the one or more displays through the communication unit to display a home button that corresponds to the event; and
      in response to a touch input being applied to the home button, control the one or more displays to display an icon list that corresponds to the event,
   wherein the event comprises an entrance of an occupant to the vehicle, and
   wherein the at least one processor is further configured to:
      based on a presence of the occupant in a first seat of the vehicle, control a first display to display the home button on a first area of the first display; and
      based on a presence of the occupant in a second seat of the vehicle, control the first display to display the home button on a second area of the first display, the second area of the first display being different from the first area of the first display,
   wherein the at least one processor is further configured to display the icon list based on at least one of a characteristic of the occupant or a position of the occupant in the vehicle, and
   wherein the at least one processor is further configured to:
      based on a presence of the occupant in a first seat of the vehicle, control a first display among the one or more displays to display the home button; and
      based on a presence of the occupant in a second seat of the vehicle, control a second display among the one or more displays to display the home button.

2. The vehicle control device of claim 1, wherein the at least one processor is configured to, based on the occurrence of the event, control the one or more displays through the communication unit to display the home button corresponding to the event by:
   based on an occurrence of a first event, controlling a first display among the one or more displays through the communication unit to display a first home button corresponding to the first event; and
   based on an occurrence of a second event, controlling a second display among the one or more displays through the communication unit to display a second home button corresponding to the second event.

3. The vehicle control device of claim 1, wherein the at least one processor is further configured to, based on an exit of the occupant from the vehicle, control the one or more displays through the communication unit to remove the home button from the one or more displays.

4. The vehicle control device of claim 1, wherein the at least one processor is further configured to:
   receive an image from a camera configured to image an inside of the vehicle;
   select one among a plurality of icon lists based on detecting the occupant in the image; and set the selected one among the plurality of icon lists as the icon list to be displayed in response to the touch input applied to the home button.

5. The vehicle control device of claim 1, wherein the at least one processor is further configured to:
  select at least one first display among the one or more displays based on the position of the occupant in the vehicle;
  control the at least one display through the communication unit to display the home button;
  vary the at least one selected display according to the event; and
  control at least one second display, which was not selected among the one or more displays based on the position of the occupant in the vehicle, to not display the home button.

6. The vehicle control device of claim 1, wherein the at least one processor is further configured to, based on first and second occupants entering the vehicle, control the one or more displays through the communication unit to display a first home button corresponding to the first occupant and a second home button corresponding to the second occupant.

7. The vehicle control device of claim 6, wherein the at least one processor is further configured to:
  display the first home button on a first display among the one or more displays and, based on a touch input being applied to the first home button, cause the first display to change a first screen displayed on the first display; and
  display the second home button on a second display among the one or more displays and, based on a touch input being applied to the second home button, cause the second display to change a second screen displayed on the second display.

8. The vehicle control device of claim 6, wherein the at least one processor is further configured to, based on the first and second home buttons being displayed on any one display among the one or more displays, divide the any one display into a first region displaying a first screen and a second region displaying a second screen.

9. The vehicle control device of claim 8, wherein the at least one processor is further configured to:
  based on a touch input being applied to the first home button, cause the first region to change the first screen; and
  based on a touch input being applied to the second home button, cause the second region to change the second screen.

10. The vehicle control device of claim 9, wherein the at least one processor is further configured to:
  responsive to a drag input on one of the first or second home buttons, move the one of the first or second home buttons on the any one display according to the drag input; and
  vary the first and second regions based on a position of the one of the first or second home buttons.

11. The vehicle control device of claim 10, wherein the at least one processor is further configured to, based on the one of the first or second home buttons being moved to a position within a first distance from the other of the first or second home buttons:
  control the any one display through the communication unit to not display the other of the first or second home buttons and the second screen; and
  control the any one display to display the first screen on the first and second regions.

12. The vehicle control device of claim 10, wherein the at least one processor is further configured to:
  display, on the any one display, a boundary defining the first and second regions; and
  based on a touch input being applied to the boundary:
    adjust a size of at least one of the first or second regions; and
    change a displaying of at least one of the first or second home buttons based on the adjusted size of the at least one of the first or second regions.

13. The vehicle control device of claim 6, wherein the at least one processor is further configured to, in response to a home button removal command, control the one or more displays through the communication unit to not display at least one of the first or second home buttons.

14. The vehicle control device of claim 1, wherein the at least one processor is configured to display the icon list by:
  displaying the icon list as comprising a first icon that corresponds to control of an electric or electronic component provided at the first seat or at a region adjacent to the first seat; and
  based on the presence of the occupant in the second seat, displaying the icon list as further comprising a second icon that corresponds to control of an electric or electronic component provided at the second seat or at a region adjacent to the second seat.

15. The vehicle control device of claim 1, wherein the at least one processor is further configured to:
  recognize a fingerprint from the touch input applied to the home button; and
  based on a recognition of the fingerprint and in a state in which a first icon list is set to be displayed in response to the touch input, set a second icon list that is different from the first icon list to be displayed in response to the touch input.

16. The vehicle control device of claim 15, wherein the at least one processor is further configured to, based on lack of recognition of the fingerprint, change a shape of the home button from a first shape to a second shape.

17. The vehicle control device of claim 1, wherein the at least one processor is further configured to:
  determine a number of home buttons based on the event; and
  control the one or more displays through the communication unit to display the home buttons corresponding to the number of the home buttons.

18. The vehicle control device of claim 17, wherein the at least one processor is further configured to, based on a determination that a first condition is met, control the one or more displays through the communication unit to display one or more pop-up windows corresponding to the number of the home buttons.

19. The vehicle control device of claim 1, wherein the event comprises a receipt of a home button generation command from a driver of the vehicle, and
  wherein the at least one processor is further configured to control the one or more displays to display one or more home buttons corresponding to a number that is input by the driver.

20. The vehicle control device of claim 19, wherein the at least one processor is further configured to, based on the number that is input by the driver being plural, control any one display among the one or more displays to display a plurality of home buttons corresponding to the number input, the any one display comprising a plurality of regions, wherein a number of the plurality of regions is greater than or equal to a number of the plurality of home buttons, and wherein each region of the any one display is configured to display one or more of the plurality of home buttons.

* * * * *